(12) United States Patent
Weagle

(10) Patent No.: US 11,945,539 B2
(45) Date of Patent: Apr. 2, 2024

(54) DUAL SIDED SUSPENSION ASSEMBLY FOR A CYCLE WHEEL

(71) Applicant: SPECIALIZED BICYCLE COMPONENTS, INC., Morgan Hill, CA (US)

(72) Inventor: David Weagle, Edgartown, MA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 343 days.

(21) Appl. No.: 17/109,029

(22) Filed: Dec. 1, 2020

(65) Prior Publication Data
US 2021/0323633 A1  Oct. 21, 2021

Related U.S. Application Data

(63) Continuation of application No. 16/125,085, filed on Sep. 7, 2018, now abandoned.

(51) Int. Cl.
*B62K 25/08* (2006.01)
*B62K 21/02* (2006.01)
*B62K 25/24* (2006.01)

(52) U.S. Cl.
CPC .............. *B62K 25/08* (2013.01); *B62K 21/02* (2013.01); *B62K 25/24* (2013.01); *B60G 2300/12* (2013.01); *B62K 2201/08* (2013.01)

(58) Field of Classification Search
CPC ......... B62K 25/24; B62K 25/08; B62K 21/02
See application file for complete search history.

(56) References Cited

U.S. PATENT DOCUMENTS

| 389,200 A | 9/1888 | Clegg |
| 393,387 A | 11/1888 | Norton |

(Continued)

FOREIGN PATENT DOCUMENTS

| BE | 507753 | 12/1951 |
| CA | 474575 | 6/1951 |

(Continued)

OTHER PUBLICATIONS

Black and white photograph of Greeves trials machine, Applicant Admitted Prior Art, Applicant's internal files.

(Continued)

*Primary Examiner* — Tony H Winner
*Assistant Examiner* — Hosam Shabara
(74) *Attorney, Agent, or Firm* — KNOBBE, MARTENS, OLSON & BEAR, LLP

(57) ABSTRACT

A trailing link multi-bar suspension assembly for a cycle having improved stability includes a first arm having a first side and a second side, a first arm fixed pivot and a first arm shock pivot, the first side and second side defining a wheel opening. A shock link has a shock link fixed pivot and a shock link floating pivot. A shock absorber has an inline configuration, a gas spring, a first shock mount, and a second shock mount, and the shock absorber is substantially located on the first side or second side of the wheel opening. A spring unit, has a gas spring comprising a spring body, a first spring mount and a second spring mount, and the spring unit is substantially located on the first side or second side of the wheel opening A wheel carrier has a wheel carrier first pivot and a wheel carrier second pivot spaced apart from one another, and a wheel mount that is adapted to be connected to a wheel. A control link has a control link floating pivot and a control link fixed pivot, the control link floating pivot being pivotably connected to the wheel carrier second pivot, (Continued)

and the control link fixed pivot being pivotably connected to the first arm control pivot.

17 Claims, 19 Drawing Sheets

(56) References Cited

U.S. PATENT DOCUMENTS

| | | |
|---|---|---|
| 400,727 A | 4/1889 | Baudreau |
| 412,322 A | 10/1889 | Copeland |
| 414,048 A | 10/1889 | Hunter |
| 423,471 A | 3/1890 | Easthope |
| 426,402 A | 4/1890 | Torkelson |
| 435,477 A | 9/1890 | Blackledge |
| 441,649 A | 12/1890 | Dunlop |
| 443,266 A | 12/1890 | Bell |
| 444,639 A | 1/1891 | O'Neill |
| 447,234 A | 2/1891 | Donnelly |
| 467,794 A | 1/1892 | Ellis |
| 468,643 A | 2/1892 | Clement |
| 524,389 A | 8/1894 | La Casse |
| 602,354 A | 4/1898 | Ohlgart |
| 638,723 A | 12/1899 | Kelly |
| 739,476 A | 9/1903 | Becker |
| 783,236 A | 2/1905 | Ashburn |
| 848,324 A | 3/1907 | Sager |
| 913,961 A | 3/1909 | Levedahl |
| 927,989 A | 7/1909 | Meiser |
| 940,245 A | 11/1909 | Gates |
| 946,143 A | 1/1910 | Levedahl |
| 953,697 A | 4/1910 | Kuebodeaux |
| 973,071 A | 10/1910 | Redmond |
| 979,674 A | 12/1910 | Kittle et al. |
| 980,999 A | 1/1911 | Pommer |
| 989,638 A | 4/1911 | Pilgrm |
| 1,000,115 A | 8/1911 | Oquist |
| 1,036,263 A | 8/1912 | Kittle |
| 1,042,480 A | 10/1912 | Ridgway |
| 1,077,105 A | 10/1913 | Stewart |
| 1,096,417 A | 5/1914 | Ekstrom |
| 1,101,614 A | 6/1914 | Bramham |
| 1,132,829 A | 3/1915 | Cobb |
| 1,166,156 A | 12/1915 | Shimmin |
| 1,189,874 A | 7/1916 | Schickel |
| 1,203,927 A | 11/1916 | Stagni |
| 1,213,995 A | 1/1917 | Anderson |
| 1,223,572 A | 4/1917 | Drew |
| 1,227,634 A | 5/1917 | Lake |
| 1,251,992 A | 1/1918 | Drew |
| 1,254,798 A | 1/1918 | Harley |
| 1,273,179 A | 7/1918 | Perry et al. |
| 1,298,958 A | 4/1919 | Johnston |
| 1,333,449 A | 3/1920 | Russell |
| 1,365,524 A | 1/1921 | Mellantine |
| 1,397,850 A | 11/1921 | Yoxall et al. |
| 1,432,376 A | 10/1922 | Wolff |
| 1,452,436 A | 4/1923 | Pullin |
| 1,475,044 A | 11/1923 | Bloom |
| 1,517,146 A | 11/1924 | Bloom |
| 1,527,133 A | 2/1925 | Harley |
| 1,605,680 A | 11/1926 | Merkel |
| 1,834,308 A | 12/1931 | Harley |
| 1,924,363 A | 8/1933 | Kanai |
| 1,924,586 A | 8/1933 | Zerk |
| 1,999,394 A | 4/1935 | Burnett |
| 2,038,011 A | 4/1936 | Spiegler et al. |
| 2,063,704 A | 12/1936 | Slack |
| 2,073,736 A | 3/1937 | Duffy |
| 2,087,299 A | 7/1937 | Pribil |
| 2,160,034 A | 5/1939 | Schwinn |
| 2,170,565 A | 8/1939 | Macbeth |
| 2,203,342 A | 6/1940 | Sloman |
| 2,233,313 A | 2/1941 | Hazelroth |
| 2,271,304 A | 1/1942 | Mulholland |
| 2,376,788 A | 5/1945 | Latscher-Latka |
| 2,462,711 A | 2/1949 | Barnett |
| 2,463,310 A | 3/1949 | Probst |
| 2,464,326 A | 3/1949 | MacGregor |
| 2,475,774 A | 7/1949 | Benson |
| 2,485,484 A | 10/1949 | Dean |
| 2,486,430 A | 11/1949 | Moore |
| 2,489,821 A | 11/1949 | Ryder |
| 2,504,452 A | 4/1950 | Rostan |
| 2,525,171 A | 10/1950 | Franks |
| 2,537,679 A | 1/1951 | Kraeft |
| 2,540,585 A | 2/1951 | Kranz |
| 2,543,991 A | 3/1951 | Schuricht |
| 2,550,876 A | 5/1951 | Spencer |
| 2,561,156 A | 7/1951 | Thorkildsen |
| 2,588,889 A | 3/1952 | Sherwood |
| 2,596,411 A | 5/1952 | Jordan |
| 2,636,567 A | 4/1953 | Landrum |
| 2,649,312 A | 8/1953 | Miller |
| 2,660,455 A | 11/1953 | Douglas et al. |
| 2,664,644 A | 1/1954 | Tyerman |
| 2,708,112 A | 5/1955 | Seddon et al. |
| 2,729,465 A | 1/1956 | Torre |
| 2,751,991 A | 6/1956 | Mennesson |
| 2,752,167 A | 6/1956 | Propst et al. |
| 2,756,070 A | 7/1956 | Torre |
| 2,756,832 A | 7/1956 | Dalrymple |
| 2,855,212 A | 10/1958 | Houser |
| 2,918,306 A | 12/1959 | Lewandoski |
| 2,953,395 A | 9/1960 | Turner |
| 2,969,992 A | 1/1961 | Hahn |
| 2,976,056 A | 3/1961 | Henry |
| 3,083,038 A | 3/1963 | Moulton |
| 3,133,748 A | 5/1964 | Gunnerson |
| 3,188,072 A * | 6/1965 | Wustenhagen ......... F16F 9/061 |
| | | 267/64.13 |
| 3,433,318 A | 3/1969 | Packard |
| 3,673,608 A | 6/1972 | Voorman, Jr. |
| 3,694,004 A | 9/1972 | Siebers |
| 3,701,544 A | 10/1972 | Stankovich |
| 2,303,568 A | 12/1972 | McWhorter et al. |
| 3,730,553 A | 5/1973 | Harman |
| 3,774,935 A | 11/1973 | Aldrich |
| 3,942,821 A | 3/1976 | Bock |
| 3,944,254 A | 3/1976 | Inui |
| 3,954,284 A | 5/1976 | Phillips et al. |
| 3,989,261 A | 11/1976 | Kawaguchi |
| 4,030,641 A | 6/1977 | Bailey et al. |
| 4,057,264 A | 11/1977 | Suzuki et al. |
| 4,058,903 A | 11/1977 | Wilkerson |
| 4,147,371 A | 4/1979 | Morita et al. |
| 4,153,237 A | 5/1979 | Supalla |
| 4,159,123 A | 6/1979 | Petty |
| 4,162,797 A | 7/1979 | McBride |
| 4,170,369 A | 10/1979 | Strutman |
| 4,179,135 A | 12/1979 | Slater |
| 4,180,280 A | 12/1979 | Doveri |
| 4,184,695 A | 1/1980 | Roe et al. |
| 4,186,936 A | 2/1980 | Offenstadt et al. |
| 4,189,168 A | 2/1980 | Courtney |
| 4,212,481 A | 7/1980 | Ribi |
| 4,242,481 A | 12/1980 | Fannin |
| 4,265,329 A | 5/1981 | de Cortanze |
| 4,268,055 A | 5/1981 | Bell |
| 4,295,658 A | 10/1981 | Kashima |
| 4,367,882 A | 1/1983 | Alexander et al. |
| 4,388,978 A | 6/1983 | Fior |
| 4,401,316 A | 8/1983 | Miyakoshi et al. |
| 4,406,475 A | 9/1983 | Miyakoshi et al. |
| 4,408,399 A | 10/1983 | Darwood et al. |
| 4,410,196 A | 10/1983 | Ribi |
| 4,421,337 A | 12/1983 | Pratt |
| 4,422,662 A | 12/1983 | Inoue et al. |
| 4,433,850 A | 2/1984 | Miyakoshi et al. |
| 4,433,851 A | 2/1984 | Miyakoshi et al. |
| 4,437,678 A | 3/1984 | Schultz |
| 4,438,909 A | 3/1984 | Matsumoto |
| 4,444,406 A | 4/1984 | Isono |
| 4,455,032 A | 6/1984 | Kajikawa |
| 4,480,711 A | 11/1984 | Satoh et al. |

(56) References Cited

U.S. PATENT DOCUMENTS

| | | |
|---|---|---|
| 4,482,264 A | 11/1984 | Kodera |
| 4,520,892 A | 6/1985 | Satoh |
| 4,526,249 A | 7/1985 | Parker |
| 4,531,755 A | 7/1985 | Isono et al. |
| 4,533,153 A | 8/1985 | Tsunoda et al. |
| 4,540,190 A | 9/1985 | Moulton |
| 4,542,910 A | 9/1985 | Watanabe |
| 4,561,669 A | 12/1985 | Simons |
| 4,570,963 A | 2/1986 | Isono |
| 4,572,534 A | 2/1986 | Heyl |
| 4,576,393 A | 3/1986 | Moulton et al. |
| 4,585,245 A | 4/1986 | Rose |
| 4,616,810 A | 10/1986 | Richardson et al. |
| 4,625,985 A | 12/1986 | Nakano et al. |
| 4,629,205 A | 12/1986 | Haynes |
| 4,650,027 A | 3/1987 | de Cortanze |
| 4,660,683 A | 4/1987 | Hayashi et al. |
| 4,685,694 A | 8/1987 | Kouyama |
| 4,702,338 A | 10/1987 | Trema |
| 4,703,839 A | 11/1987 | Yasuo et al. |
| 4,723,621 A | 2/1988 | Kawano et al. |
| 4,732,241 A | 3/1988 | Yoshida |
| 4,738,468 A | 4/1988 | Baron |
| 4,741,545 A | 5/1988 | Honma et al. |
| 4,742,884 A | 5/1988 | Ishikawa |
| 4,744,434 A | 5/1988 | Miyakoshi et al. |
| 4,770,434 A | 9/1988 | Pietro et al. |
| 4,775,163 A | 10/1988 | McGowan et al. |
| 4,776,609 A | 10/1988 | Pan et al. |
| 4,789,174 A | 12/1988 | Lawwill |
| 4,807,898 A | 2/1989 | Huntly |
| 4,809,802 A | 3/1989 | Seino et al. |
| 4,815,763 A | 3/1989 | Hartmann |
| 4,828,069 A | 5/1989 | Hatsuyama |
| 4,834,412 A | 5/1989 | Trema |
| 4,878,558 A | 11/1989 | Asakura |
| 4,881,750 A | 11/1989 | Hartmann |
| 4,890,857 A | 1/1990 | de Cortanze |
| 4,971,344 A | 11/1990 | Turner |
| 4,993,734 A | 2/1991 | Trema |
| 4,997,197 A | 3/1991 | Shultz |
| 5,009,451 A | 4/1991 | Hayashi et al. |
| 5,042,608 A | 8/1991 | Horiike et al. |
| 5,050,699 A | 9/1991 | Savard |
| 5,064,212 A | 11/1991 | Yun |
| 5,069,303 A | 12/1991 | Fuller |
| 5,069,467 A | 12/1991 | Claudio |
| 5,088,705 A | 2/1992 | Tsai |
| 5,133,223 A | 7/1992 | Morri |
| 5,156,231 A | 10/1992 | Trema |
| 5,186,481 A | 2/1993 | Turner |
| 5,193,832 A | 3/1993 | Wilson et al. |
| 5,193,833 A | 3/1993 | Reisinger |
| 5,195,766 A | 3/1993 | Dohrmann et al. |
| 5,219,211 A | 6/1993 | Tsuchida et al. |
| 5,248,159 A | 9/1993 | Moore |
| 5,249,650 A | 10/1993 | Tanaka |
| 5,269,549 A | 12/1993 | Wilson et al. |
| 5,284,352 A | 2/1994 | Chen |
| 5,299,820 A | 4/1994 | Lawwill |
| 5,308,099 A | 5/1994 | Browning |
| 5,310,203 A | 5/1994 | Chen |
| 5,320,374 A | 6/1994 | Farris et al. |
| 5,328,196 A | 7/1994 | Ohma |
| 5,350,185 A | 9/1994 | Robinson |
| 5,354,085 A | 10/1994 | Gally |
| 5,359,910 A | 11/1994 | Chang et al. |
| 5,361,864 A | 11/1994 | Tanaka |
| 5,380,026 A | 1/1995 | Robinson |
| 5,403,028 A | 4/1995 | Trimble |
| 5,405,159 A | 4/1995 | Klein et al. |
| 5,409,248 A | 4/1995 | Williams |
| 5,413,368 A | 5/1995 | Pong et al. |
| 5,417,446 A | 5/1995 | Pileggi |
| 5,427,208 A | 6/1995 | Motobu et al. |
| 5,427,397 A | 6/1995 | Chonan |
| 5,429,380 A | 7/1995 | Lawwill |
| 5,431,426 A | 7/1995 | Ijams et al. |
| 5,441,291 A | 8/1995 | Girvin, III |
| 5,449,155 A | 9/1995 | Mack |
| 5,456,480 A | 10/1995 | Turner et al. |
| 5,462,302 A | 10/1995 | Leitner |
| 5,474,318 A | 12/1995 | Castellano |
| 5,487,223 A | 1/1996 | Krane |
| D368,054 S | 3/1996 | Behrens et al. |
| 5,498,013 A | 3/1996 | Hwang |
| 5,509,674 A | 4/1996 | Browning |
| 5,509,676 A | 4/1996 | Fukuake et al. |
| 5,564,534 A | 10/1996 | Toyoda et al. |
| 5,599,034 A | 2/1997 | Brigden |
| 5,615,756 A | 4/1997 | Grundei et al. |
| 5,709,399 A | 1/1998 | Smith, Jr. |
| 5,720,473 A | 2/1998 | Thomas |
| 5,743,547 A | 4/1998 | Voss et al. |
| 5,743,574 A | 4/1998 | Kohn |
| 5,749,590 A | 5/1998 | Roerig |
| 5,782,313 A | 7/1998 | Kurawaki et al. |
| 5,799,963 A | 9/1998 | Berkmann |
| 5,810,102 A | 9/1998 | Stewart |
| 5,813,684 A | 9/1998 | Baron |
| 5,829,773 A | 11/1998 | Rajaee |
| 5,855,388 A | 1/1999 | Brewer |
| 5,899,478 A | 5/1999 | Woodside |
| 5,908,200 A | 6/1999 | Stewart |
| 5,927,741 A | 7/1999 | Chi |
| 5,931,487 A * | 8/1999 | Koppelberg ........... B62K 25/24 |
| | | 280/124.105 |
| 5,931,489 A | 8/1999 | Damman et al. |
| 5,951,033 A | 9/1999 | Winter et al. |
| 6,017,047 A | 1/2000 | Hoose |
| 6,036,211 A | 3/2000 | Nohr |
| 6,047,981 A | 4/2000 | Burrows |
| 6,089,585 A | 7/2000 | Theobald |
| 6,149,173 A | 11/2000 | Bynoe |
| 6,152,472 A | 11/2000 | Woodside |
| 6,155,370 A | 12/2000 | Iwai et al. |
| 6,161,858 A | 12/2000 | Tseng |
| 6,164,424 A | 12/2000 | Girvin et al. |
| 6,164,675 A | 12/2000 | Pickering |
| 6,199,885 B1 | 3/2001 | Seidl |
| 6,241,391 B1 | 6/2001 | Hoose |
| 6,244,609 B1 | 6/2001 | Wilson |
| 6,260,869 B1 | 7/2001 | Hanlon et al. |
| 6,260,870 B1 | 7/2001 | Fan |
| 6,263,994 B1 | 7/2001 | Eitel |
| 6,311,961 B1 | 11/2001 | Julia |
| 6,336,647 B1 | 1/2002 | Iwai et al. |
| 6,357,775 B1 | 3/2002 | Iwai et al. |
| 6,371,263 B1 | 4/2002 | Hoose |
| 6,382,374 B1 | 5/2002 | Iwai et al. |
| 6,386,567 B1 | 5/2002 | Schonfeld |
| 6,402,175 B1 | 6/2002 | Jansson |
| 6,457,732 B2 | 10/2002 | Ito et al. |
| 6,485,043 B2 | 11/2002 | Ito et al. |
| 6,488,300 B2 | 12/2002 | Ito et al. |
| 6,517,095 B1 | 2/2003 | Lansac et al. |
| 6,517,096 B2 | 2/2003 | Yih |
| 6,533,305 B1 | 3/2003 | Falk |
| 6,783,140 B1 | 8/2004 | Huang |
| 6,789,810 B2 | 9/2004 | Strong |
| 6,896,276 B1 | 5/2005 | Sparrow |
| 6,908,092 B2 | 6/2005 | Kofuji et al. |
| 6,910,702 B1 | 6/2005 | Hals |
| 6,918,605 B2 | 7/2005 | Wada et al. |
| 6,994,365 B2 | 2/2006 | Kofuji |
| 7,011,325 B2 | 3/2006 | Kinzler et al. |
| 7,047,831 B2 | 5/2006 | Reynolds et al. |
| 7,140,627 B2 | 11/2006 | Wimmer |
| 7,159,883 B2 | 1/2007 | Mydiarz |
| 7,210,695 B2 | 5/2007 | Griffiths |
| 7,331,594 B2 | 2/2008 | Wimmer |
| 7,350,787 B2 | 4/2008 | Voss |
| 7,364,178 B2 | 4/2008 | Wimmer |
| 7,425,008 B2 | 9/2008 | Pokrywka |

(56) References Cited

U.S. PATENT DOCUMENTS

| | | |
|---|---|---|
| 7,425,009 B2 | 9/2008 | Namazue et al. |
| 7,434,823 B2 | 10/2008 | Robinson et al. |
| 7,441,622 B2 | 10/2008 | Costa |
| 7,635,141 B2 | 12/2009 | O'Connor |
| 7,699,330 B2 | 4/2010 | Chen |
| 7,708,296 B2 | 5/2010 | Becker et al. |
| 7,744,107 B2 | 6/2010 | Chen |
| 7,887,077 B2 | 2/2011 | Thiers |
| 7,896,379 B2 | 3/2011 | Nagao et al. |
| 8,333,528 B2 | 12/2012 | Oertley et al. |
| 8,448,970 B1 | 5/2013 | Vardon |
| 8,534,692 B2 | 9/2013 | Trebichavsky |
| 8,939,458 B2 | 1/2015 | Nesbitt, III |
| 1,144,753 A1 | 6/2015 | Budroe |
| 9,194,456 B2 | 11/2015 | Laird et al. |
| 9,248,883 B2 | 2/2016 | D'Aluisio |
| 9,278,598 B2 | 3/2016 | Galasso et al. |
| 9,592,838 B1 | 3/2017 | Mecklenburg et al. |
| 9,682,741 B2 | 6/2017 | Fioravanzo et al. |
| 9,707,817 B1 | 7/2017 | Arnott et al. |
| 9,724,701 B2 | 8/2017 | Harney et al. |
| 10,094,683 B1 | 10/2018 | Przykucki et al. |
| 10,099,743 B2 | 10/2018 | Walthert et al. |
| 10,196,106 B1 | 2/2019 | Weagle |
| 10,300,979 B2 | 5/2019 | Weagle |
| 10,308,312 B2 | 6/2019 | Weagle |
| D859,125 S | 9/2019 | Weagle et al. |
| D860,061 S | 9/2019 | Weagle et al. |
| D860,062 S | 9/2019 | Weagle |
| D861,542 S | 10/2019 | Weagle |
| 10,518,836 B2 | 12/2019 | Weagle |
| 10,518,839 B2 | 12/2019 | Weagle |
| 10,526,039 B2 | 1/2020 | Weagle |
| 10,526,040 B2 | 1/2020 | Weagle |
| 10,537,790 B2 | 1/2020 | Galasso et al. |
| 10,549,812 B2 | 2/2020 | Weagle |
| 10,549,813 B2 | 2/2020 | Weagle |
| 10,549,815 B2 | 2/2020 | Weagle |
| D880,369 S | 4/2020 | Weagle |
| D880,370 S | 4/2020 | Weagle |
| D880,371 S | 4/2020 | Weagle |
| D880,372 S | 4/2020 | Weagle |
| 10,689,061 B2 | 6/2020 | Weagle |
| 10,894,572 B2 | 1/2021 | Przykucki et al. |
| 10,906,601 B2 | 2/2021 | Aoki et al. |
| 11,084,552 B2 | 8/2021 | Weagle |
| 11,117,635 B2 | 9/2021 | Przykucki, Jr. et al. |
| 11,208,172 B2 | 12/2021 | Weagle |
| 11,230,346 B2 | 1/2022 | Weagle |
| 11,230,347 B2 | 1/2022 | Weagle |
| 11,230,348 B2 | 1/2022 | Weagle |
| 11,273,887 B2 | 3/2022 | Weagle |
| 11,345,432 B2 | 5/2022 | Weagle |
| 11,524,744 B2 | 12/2022 | Weagle |
| 2001/0019197 A1 | 9/2001 | Ito et al. |
| 2002/0005066 A1 | 1/2002 | Tanner et al. |
| 2002/0079670 A1 | 6/2002 | Yih |
| 2002/0084619 A1 | 7/2002 | Odom |
| 2004/0036250 A1 | 2/2004 | Kofuji |
| 2005/0248119 A1 | 11/2005 | Callahan et al. |
| 2008/0023934 A1 | 1/2008 | van Houweling |
| 2008/0041681 A1 | 2/2008 | Shipman |
| 2008/0060863 A1 | 3/2008 | Iizuka |
| 2008/0258424 A1 | 10/2008 | Paul |
| 2008/0277848 A1 | 11/2008 | Davis |
| 2008/0296863 A1 | 12/2008 | Heyl et al. |
| 2008/0303242 A1 | 12/2008 | O'Connor |
| 2009/0001684 A1 | 1/2009 | McAndrews et al. |
| 2009/0033009 A1 | 2/2009 | Kirchner et al. |
| 2009/0266656 A1 | 10/2009 | Murakami |
| 2010/0010709 A1 | 1/2010 | Song |
| 2010/0244340 A1 | 9/2010 | Wootten et al. |
| 2011/0012321 A1 | 1/2011 | Chen |
| 2011/0083930 A1 | 4/2011 | Laird et al. |
| 2011/0093930 A1 | 4/2011 | Bartel-Kurz et al. |
| 2011/0156728 A1 | 6/2011 | Sato et al. |
| 2012/0228850 A1 | 9/2012 | Tseng |
| 2012/0248666 A1 | 10/2012 | Debruler et al. |
| 2014/0061987 A1 | 3/2014 | DeBruler et al. |
| 2014/0202809 A1 | 7/2014 | Ozaki et al. |
| 2014/0316652 A1 | 10/2014 | Ericksen et al. |
| 2015/0183440 A1 | 7/2015 | Jackson |
| 2015/0317065 A1 | 11/2015 | Meriaz et al. |
| 2015/0375823 A1 | 12/2015 | Fioravanzo et al. |
| 2016/0288867 A1 | 10/2016 | Murakami |
| 2016/0339987 A1 | 11/2016 | Walthert et al. |
| 2016/0339989 A1 | 11/2016 | Walthert et al. |
| 2017/0087932 A1 | 3/2017 | Winshtein et al. |
| 2017/0198779 A1 | 7/2017 | Batsch et al. |
| 2017/0219041 A1 | 8/2017 | Debruler et al. |
| 2017/0284493 A1 | 10/2017 | Smith |
| 2018/0281878 A1 | 10/2018 | Aoki et al. |
| 2018/0297435 A1 | 10/2018 | Brady et al. |
| 2018/0304952 A1 | 10/2018 | Krugman et al. |
| 2018/0334219 A1 | 11/2018 | Walthert et al. |
| 2019/0031275 A1 | 1/2019 | Weagle |
| 2019/0031276 A1 | 1/2019 | Weagle |
| 2019/0031277 A1 | 1/2019 | Weagle |
| 2019/0039681 A1 | 2/2019 | Weagle |
| 2019/0047657 A1 | 2/2019 | Weagle |
| 2019/0047658 A1 | 2/2019 | Weagle |
| 2019/0061865 A1 | 2/2019 | Weagle |
| 2019/0061866 A1 | 2/2019 | Weagle |
| 2019/0061867 A1 | 2/2019 | Weagle |
| 2019/0061868 A1 | 2/2019 | Weagle |
| 2019/0092116 A1 | 3/2019 | Magnus et al. |
| 2019/0168838 A1 | 6/2019 | Weagle |
| 2020/0079462 A1 | 3/2020 | Weagle |
| 2020/0079463 A1 | 3/2020 | Weagle |
| 2020/0094908 A1 | 3/2020 | Weagle |
| 2020/0094910 A1 | 3/2020 | Weagle |
| 2020/0354012 A1 | 11/2020 | Pelot |
| 2021/0323632 A1 | 10/2021 | Weagle |
| 2022/0097792 A1 | 3/2022 | Przykucki, Jr. et al. |
| 2022/0153381 A1 | 5/2022 | Zawistowski et al. |
| 2022/0204123 A1 | 6/2022 | Weagle |
| 2022/0363335 A1 | 11/2022 | Weagle |
| 2022/0363336 A1 | 11/2022 | Weagle |
| 2023/0023390 A1 | 1/2023 | Weagle |
| 2023/0271670 A1 | 8/2023 | Weagle |

FOREIGN PATENT DOCUMENTS

| | | |
|---|---|---|
| CH | 63758 | 2/1914 |
| CN | 1309053 | 8/2001 |
| CN | 2846274 Y | 12/2006 |
| CN | 201198348 | 2/2009 |
| CN | 302966622 | 10/2014 |
| CN | 303438302 | 11/2015 |
| CN | 303584666 | 2/2016 |
| CN | 303604532 | 3/2016 |
| CN | 304240449 | 8/2017 |
| CN | 304327156 | 10/2017 |
| DE | 1084599 | 6/1960 |
| DE | 1122392 | 1/1962 |
| DE | 3133576 | 5/1983 |
| DE | 3223728 | 12/1983 |
| DE | 8906328 | 11/1989 |
| DE | 3833880 | 4/1990 |
| DE | 4119339 | 1/1992 |
| DE | 9404873 | 5/1994 |
| DE | 9403640 | 6/1994 |
| DE | 9414705 | 2/1995 |
| DE | 19503047 | 8/1996 |
| DE | 19635939 | 6/1997 |
| DE | 19633692 | 2/1998 |
| DE | 10-2013-004788 | 9/2013 |
| DK | 49600 | 12/1934 |
| EP | 0032170 | 2/1986 |
| EP | 0030306 | 4/1986 |
| EP | 0125244 | 1/1987 |
| EP | 0399615 | 11/1990 |
| EP | 0336891 | 7/1992 |
| EP | 420610 | 2/1996 |

(56) References Cited

FOREIGN PATENT DOCUMENTS

| | | |
|---|---|---|
| EP | 726198 | 8/1996 |
| EP | 0744562 | 11/1996 |
| EP | 0731017 | 10/1997 |
| EP | 0941916 | 9/1999 |
| EP | 0992374 | 4/2000 |
| EP | 1049618 | 9/2003 |
| EP | 728093 | 11/2005 |
| EP | 02000398 | 12/2008 |
| EP | 01884455 | 4/2009 |
| EP | 2096024 | 9/2009 |
| EP | 2100807 | 9/2009 |
| EP | 2357098 | 8/2011 |
| EP | 02001733 | 12/2012 |
| EP | 2483141 | 11/2013 |
| EP | 02913257 | 9/2015 |
| FR | 347724 | 3/1905 |
| FR | 353990 | 9/1905 |
| FR | 350269 | 12/1905 |
| FR | 376759 | 8/1907 |
| FR | 467213 | 6/1914 |
| FR | 547006 | 11/1922 |
| FR | 559088 | 9/1923 |
| FR | 28240 | 1/1925 |
| FR | 636211 | 4/1928 |
| FR | 902973 | 9/1945 |
| FR | 972653 | 2/1951 |
| FR | 1030006 | 6/1953 |
| FR | 1032268 | 6/1953 |
| FR | 1059922 | 3/1954 |
| FR | 1064265 | 5/1954 |
| FR | 1067221 | 6/1954 |
| FR | 1082316 | 12/1954 |
| FR | 2418742 | 9/1979 |
| FR | 2494208 | 5/1982 |
| FR | 2687976 | 9/1993 |
| FR | 3004415 | 10/2014 |
| GB | 166065 | 7/1921 |
| GB | 223638 | 10/1924 |
| GB | 238069 | 8/1925 |
| GB | 239848 | 12/1925 |
| GB | 258141 | 9/1926 |
| GB | 264003 | 1/1927 |
| GB | 279630 | 11/1927 |
| GB | 302026 | 12/1928 |
| GB | 322370 | 12/1929 |
| GB | 469697 | 7/1937 |
| GB | 585122 | 1/1947 |
| GB | 585904 | 2/1947 |
| GB | 586372 | 3/1947 |
| GB | 691551 | 5/1953 |
| GB | 717259 | 10/1954 |
| GB | 720093 | 12/1954 |
| GB | 824866 | 12/1959 |
| GB | 841523 | 7/1960 |
| GB | 1540824 | 2/1979 |
| GB | 1545403 | 5/1979 |
| GB | 2038736 | 7/1980 |
| GB | 2052407 | 1/1981 |
| GB | 2073680 | 10/1981 |
| GB | 2106843 | 4/1983 |
| JP | S60-110588 | 6/1985 |
| JP | S61-124683 | 2/1986 |
| JP | S61-160380 | 7/1986 |
| JP | S62-187608 | 8/1987 |
| JP | 63-112191 U | 7/1988 |
| JP | 649887 U | 1/1989 |
| JP | 1204884 | 8/1989 |
| JP | 5069875 | 3/1993 |
| JP | 05-020635 | 5/1993 |
| JP | 1999-091671 | 4/1999 |
| JP | 2000159170 | 6/2000 |
| JP | 2000159171 | 6/2000 |
| JP | 2000159177 | 6/2000 |
| JP | 2000159178 | 6/2000 |
| JP | 2000168666 | 6/2000 |
| KR | 10-2009-0117921 | 11/2009 |
| TW | 416920 | 1/2001 |
| TW | 484570 U | 4/2002 |
| TW | 568054 U | 12/2003 |
| TW | 596028 | 6/2004 |
| TW | D111693 | 7/2006 |
| TW | M335458 U | 7/2008 |
| TW | M354565 U | 4/2009 |
| TW | D140125 | 4/2011 |
| TW | D149623 | 10/2012 |
| TW | 2017-22777 | 7/2017 |
| WO | WO 1982/00445 | 2/1982 |
| WO | WO 1984/00526 | 2/1984 |
| WO | WO 1987/01670 | 3/1987 |
| WO | WO 1995/23728 | 9/1995 |
| WO | WO 1997/46443 | 12/1997 |
| WO | WO 1999/10224 | 3/1999 |
| WO | WO 2000/013961 | 3/2000 |
| WO | WO 2002/038437 | 5/2002 |
| WO | WO 2019/046039 | 3/2019 |
| WO | WO 2019/046040 | 3/2019 |
| WO | WO 2021/066819 | 4/2021 |

OTHER PUBLICATIONS

Black and white photograph of Scorpion motorcycle, Applicant Admitted Prior Art, Applicant's internal files.
Black and white photograph of Silencer motorcycle, Applicant Admitted Prior Art, Applicant's internal files.
Color photograph of a cotton TC-70 motorcycle, Applicant Admitted Prior Art, Applicant's internal files.
Color photograph of Armstrong bicycle, Applicant Admitted Prior Art, Applicant's Internal Files.
Color photograph of Armstrong motorcycle, Applicant Admitted Prior Art, Applicant's internal files.
Anubi et al., "Variable stiffness suspension system", Mechanical Sciences, vol. 4:139-151 (2013), www.mech-sci-net/4/139/2013.
International Preliminary Report on Patentability for application No. PCT/US2019/049427, dated Mar. 9, 2021, in 7 pages.
International Search Report and Written Opinion for application No. PCT/US2019/049427, dated May 27, 2020, in 9 pages.
International Preliminary Report on Patentability for application No. PCT/US2019/055915, dated Apr. 8, 2021, in 9 pages.
International Search Report for application No. PCT/US2019/055915, dated Dec. 6, 2019, in 13 pages.

* cited by examiner

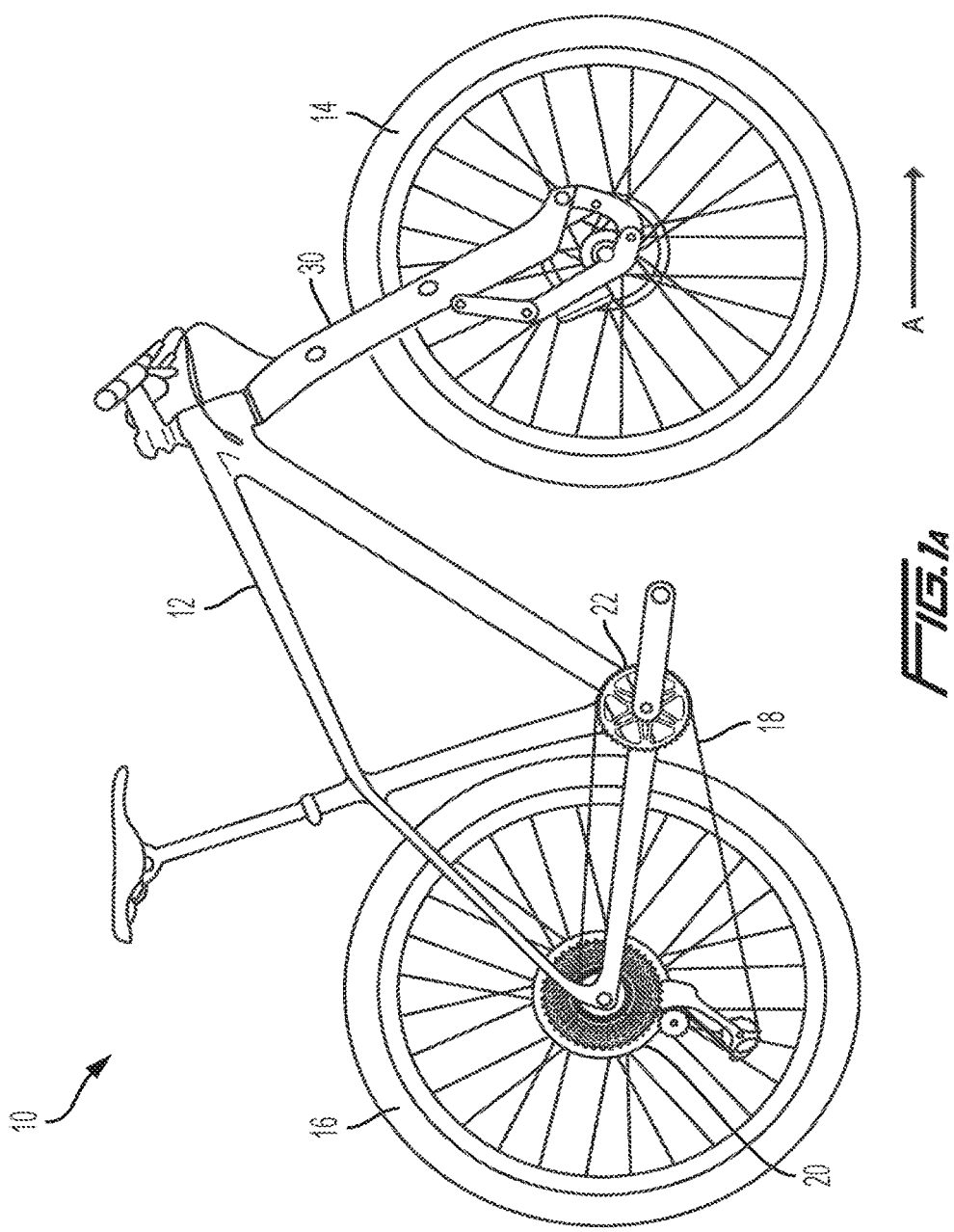

DUAL SIDED SUSPENSION ASSEMBLY FOR A CYCLE WHEEL

CROSS REFERENCE TO RELATED APPLICATIONS

This application is a continuation of co-pending U.S. patent application Ser. No. 16/125,085, filed Sep. 7, 2018, the entirety of which is hereby incorporated by reference herein.

FIELD OF THE INVENTION

The disclosure is generally directed to wheel suspension assemblies for cycles, and more specifically directed to wheel suspension assemblies for cycles that improve stability and that have a shock absorber with an inline configuration on a first arm of a steering fork, and a spring unit on a second arm of the steering fork.

BACKGROUND

Recently, telescopic front suspension forks have dominated suspension systems for two-wheeled vehicles. A telescopic fork includes sliding stantions connected in a steerable manner to a cycle frame, the sliding stanchions forming a telescoping mechanism for shock absorption during riding over rough terrain. Sliding stantions require very tight manufacturing tolerances, so expensive round centerless ground stantions are almost always used in high performance telescopic forks. Outer surfaces of the stantion typically slide against bushings to allow for compliance, and in many designs, the inner surfaces of the stantions slide against a damper or air spring piston to absorb shocks.

Front suspension for a cycle is subject to large bending forces fore and aft and less significant lateral forces. The round stantions in a telescopic fork must be sized to support the greatest loads, in the fore/aft direction. This requires the use of large diameter stantions. The larger the stantions, the greater the area of the supporting bushings and sliding surfaces. Because of the stacked layout, multiple redundant sliding surfaces must be used to seal in oil and air, as well as provide ample structural support.

Because telescopic forks have relatively large stantions, and relatively large siding surfaces and seals, large breakaway friction in the system (known as stiction) is generated by these components. Stiction resists compression of the suspension in reaction to bumps, which is a drawback in a suspension product where the goal is to react to road or terrain conditions, for example by deflecting in response to ground conditions, and/or absorbing impact from bumps. Additionally, as the telescopic fork is loaded in the fore/aft direction (usually on impact or braking), the bushings bind, resulting in even greater stiction at the exact moment when a rider needs the most compliance.

The higher the fore/aft load on the telescopic fork, the less effective the telescopic fork is at absorbing bumps. Most modern telescopic forks for cycles and motorcycles exhibit around 130 Newtons of stiction at their best, and thousands of Newtons of stiction when exposed to fore/aft loads.

Additionally, in the telescopic fork, mechanical trail is constrained by steering axis (head tube) angle and fork offset, a term for the perpendicular distance between the wheel rotation axis and the steering axis. Another problem with telescopic fork architecture is that when they are installed, mechanical trail reduces as the suspension is compressed, which reduces stability. When mechanical trail reduces, as the suspension compresses, less torque is required to steer the front wheel, causing a feeling of instability. This instability is a flaw in the telescopic fork. However, because most riders of 2-wheeled vehicles grew up only riding telescopic forks, they only know this feeling and nothing else. Thus, the inherent instability of a telescopic fork is the accepted normal.

Another drawback of the telescopic fork is a lack of leverage ratio. Telescopic forks compress in a linear fashion in response to bumps. The wheel, spring, and/or damper all move together at the same rate because they are directly attached to each other. Because the fork compresses linearly, and because the spring and damper are connected directly to the wheel, the leverage ratio of wheel to damper and spring travel is a constant 1:1.

Yet another drawback of telescopic forks is that angle of attack stability and stiction increase and oppose one another. In other words, as angle of attack stability increases, stiction also increases, which is undesirable. This problem is caused by the rearward angle of the fork stantions. The less steeply (slacker) the fork stantions are angled, the better the angle of attack is in relation to oncoming bumps. However, because the fork angle is largely governed by the steering axis (head tube) angle of the cycle's frame the sliding stantions develop increased bushing load, and greater bending, resulting in increased stiction when slacker fork angles are used.

A further drawback of telescopic forks is called front suspension dive. When a rider applies the front brake, deceleration begins and the rider's weight transfers towards the front wheel, increasing load on the fork. As the telescopic front fork dives (or compresses) in response, the suspension stiffens, and traction reduces. This same load transfer phenomenon happens in most automobiles as well, but there is a distinction with a cycle telescopic fork in that the undesirable braking reaction in a cycle telescopic fork is made up of two components, load transfer and braking squat.

Load transfer, occurs when the rider's weight transfers forward during deceleration. That weight transfer causes an increased load on the front wheel, which compresses the front suspension.

Braking squat is measured in the front suspension kinematics, and can have a positive, negative, or zero value. This value is independent of load transfer, and can have an additive or subtractive effect to the amount of fork dive present during braking. A positive value (known as pro-dive) forcibly compresses the front suspension when the brakes are applied, cumulative to the already present force from load transfer. A zero value has no braking reaction at all; the front suspension is free to respond naturally to the effects of load transfer (for better or worse). A negative value (known as anti-dive) counteracts the front suspension's tendency to dive by balancing out the force of load transfer with a counteracting force.

With a telescopic fork, the only possible braking squat reaction is positive. Any time that the front brake is applied, the rider's weight transfers forward, and additionally, the positive pro-dive braking squat reaction forcibly compresses the suspension. Effectively, this fools the front suspension into compressing farther than needed, which reduces available travel for bumps, increases spring force, and reduces traction.

Angular wheel displacement relative to the ground during vertical suspension compression is an important characteristic to limit in a front suspension. A front wheel plane is constrained perpendicularly to the front axle, and symmetric to the front wheel when measured in an unladen state.

During vertical suspension compression, and in the case where the front wheel and front wheel plane are angularly displaced away from perpendicular with the ground and ground plane, the front wheel can exhibit a transient steering response or provide vague steering feedback for the rider, causing difficulty in control of the steering.

Telescopic forks are usually available in one of two layouts, called conventional and inverted.

A conventional layout typically has two fixed inner stantions attached to a steering head, and an outer unitized lower leg assembly with a brace sometimes called an arch that connects two sliding members together and maintains relative common displacement between the two sliding members as the suspension compresses and extends. The arch is a structural member connecting the two sliding members and that the arch typically extends around the outer circumference of the wheel. The conventional telescopic fork can use conventional and universal hubs, along with quick release style axles, which are less costly and more convenient for the user than custom designs or clamped axles.

Inverted telescopic fork layouts have the inner stantions connected to the wheel axle, and two outer sliding members connected to a steering assembly. Because the two sliding stantions are only connected to each other by a wheel axle, this axle and the hub connection is used to maintain relative common displacement between the two sliding members as the suspension compresses and extends. Typically, the axle needs to be oversized in diameter and requires a secure connection to the stantions so that the axle is limited in both rotation and bending, to provide the stiffness required to limit angular wheel displacement. This oversized axle and clamping in turn requires oversized and heavy bearings and huh parts and requires the user to spend more time during assembly and disassembly of the front wheel from the inverted fork. The custom hubs required to work with the oversized axles are not typically universally mountable, are more costly than conventional hubs.

The inherent disadvantages of telescopic forks are not going away. In fact, as technology has improved in cycling, the speeds and loads that riders are putting into modern cycles, bicycles, motorcycles, and mountain cycles only make the challenges for the telescopic fork greater.

Linkage front suspensions have been attempted in the past as an alternative to telescopic forks, yet they have failed to overcome the inherent disadvantages of telescopic forks. Past linkage front suspensions have also failed to achieve prolonged market acceptance due to issues including difficult fitment to frames, limited access to adjustments, the exposure of critical parts to the weather, accelerated wear characteristics, difficulty of maintenance, undesirable ride and handling characteristics, and undesirable aesthetics.

Other linkage front suspensions have used shock absorbers including dampers and springs. In shock absorber designs using a gas spring, normal practice is to attach a gas spring piston to the damper body, such that the gas spring is situated outboard and concentric to the damper. This outboard and concentric arrangement of the gas spring with relation to the damper is referred to as a concentric shock absorber or shock absorber having a concentric configuration, and forces compromises in suspension design. These compromises can include a necessarily large overall diameter of the shock absorber which results in a large size and difficult fitment, or can require extremely small diameter damper pistons which impart detrimental damper performance, or can require extremely small area gas spring pistons which impart detrimental gas spring performance. Due to the necessarily large overall diameter of the concentric shock absorber, many other linkage front suspensions have been forced to mount the shock absorber external to the suspension, such that it is exposed to the weather. These suspensions using external shock absorbers have an unrefined and undesirable aesthetic appearance, along with the performance disadvantages that come with the external and concentric shock absorber arrangements.

Linkage front suspensions have the challenge of controlling angular wheel displacement relative to the fixed portions of the frame. Linkage front suspensions having linkage assemblies that are located on opposite sides of a wheel also have used a structural member otherwise known as an arch that connects the linkage assemblies by extending around a circumference of the wheel. This connection helps to maintain relative common displacement between the linkage members as the suspension compresses and extends. In some cases, this type of arch design requires the linkages to be placed close to the outside diameter of the wheel to use a shorter and stiffer arch, or alternatively use a very long, flexible, and heavy arch to connect all the way around the wheel. Locating linkage members as close to the wheel contact point is desirable because this helps to give the links a mechanical advantage in controlling internal chassis forces with as lightweight of a structure as possible. Moving the linkages far away from the contact point is undesirable because presents an issue where angular wheel displacement and lateral wheel displacement can be magnified due to the amplification of unwanted linkage movement or flex.

SUMMARY

In accordance with one exemplary aspect, a suspension assembly for a cycle includes a steering fork having a first arm and a second arm. One or both of the first arm and the second arm may include a first end and a second end, and one or both of the first arm and the second arm further may include a fixed pivot and a shock pivot, the space between first arm and second arm defining a wheel opening. The suspension assembly also includes a shock link having a shock link fixed pivot and a shock link floating pivot spaced apart from one another. The shock link is operatively connected to the first arm fixed pivot at the shock link fixed pivot such that the shock link is rotatable, pivotable, or bendable about the shock link fixed pivot and the shock link fixed pivot remains in a fixed location relative to the first arm while the shock link floating pivot is movable relative to the first arm. The suspension assembly also includes a shock absorber having an inline configuration, a gas spring, a first shock mount, and a second shock mount, the shock absorber being located substantially on one of the first arm or second arm, the first shock mount being operatively connected to the first arm shock pivot and the second shock mount being operatively connected to a shock connection pivot located between the shock link fixed pivot and the shock link floating pivot along a length of the shock link. The suspension assembly also includes a spring unit having a gas spring, a first spring mount, and a second spring mount, the spring unit being substantially located on the other of the first arm or second arm, opposite the shock absorber. The suspension assembly also includes a wheel carrier having a wheel carrier first pivot and a wheel carrier second pivot spaced apart from one another along a length of the wheel carrier. A wheel mount on the wheel carrier is adapted to be connected to a front wheel and the wheel carrier first pivot is operatively connected to the shock link floating pivot so that the wheel carrier second pivot is rotatable, pivotable, flexible or bendable about the wheel carrier first pivot relative to the shock link floating pivot. The suspension assembly also includes a control link having a control link floating pivot and a control link fixed pivot. The control link floating pivot is operatively connected to the wheel carrier second pivot, and the control link fixed pivot is operatively connected to the first arm control pivot such that the control link floating pivot is rotatable, pivotable, flexible, or bendable about the control link fixed pivot, which remains in a fixed location relative to the first arm control pivot. The fixed pivots and the floating pivots are arranged in a trailing configuration where each of the fixed pivots is forward of the corresponding floating pivot in the forward direction of travel. When a front wheel is connected to the wheel mount, the front wheel moves within an envelope during suspension compression and extension, and the wheel opening allows clearance for the front wheel so that the front wheel does not contact the steering fork during suspension compression and extension.

In accordance with another exemplary aspect, a wheel suspension assembly for a cycle includes a steering fork having a first arm and a second arm. The steering fork is rotatable about a steering axis. The first arm is angled relative to the steering axis and the first arm has a first end and a second end. At least one of the first arm and the second arm includes a fixed pivot and a shock pivot, the space between the first arm and second arm defining a wheel opening. The suspension assembly also includes a shock link having a shock link fixed pivot and a shock link floating pivot spaced apart from one another. The shock link is operatively connected to the first arm fixed pivot at the shock link fixed pivot such that the shock link is rotatable, pivotable, flexible or bendable about the shock link fixed pivot and the shock link fixed pivot remains in a fixed location relative to the first arm while the shock link floating pivot is movable relative to the first arm. The suspension assembly also includes a shock absorber having an inline configuration, a gas spring, a first shock mount, and a second shock mount, the shock absorber being located substantially on one of the first side or second side. The first shock mount is operatively connected to the first arm shock pivot, and the second shock mount is operatively connected to a shock connection pivot located between the shock link fixed pivot and the shock link floating pivot along a length of the shock link. The suspension assembly also includes a spring unit having a gas spring, a first spring mount, and a second spring mount, the spring unit being located substantially on the other of the first arm or second arm, opposite the shock absorber. The suspension assembly also includes a wheel carrier having a wheel carrier first pivot and a wheel carrier second pivot spaced apart from one another along a length of the wheel carrier. The wheel carrier also includes a wheel mount. The wheel carrier first pivot is operatively connected to the shock link floating pivot so that the wheel carrier second pivot is rotatable, pivotable, flexible, or bendable about the wheel carrier first pivot relative to the shock link floating pivot. The suspension assembly also includes a control link having a control link floating pivot and a control link fixed pivot. The control link floating pivot is operatively connected to the wheel carrier second pivot, and the control link fixed pivot is operatively connected to the first arm control pivot such that the control link floating pivot is rotatable, pivotable, flexible, or bendable about the control link fixed pivot, which remains in a fixed location relative to the first arm control pivot. A wheel is rotatably attached to the wheel carrier at the wheel mount. The fixed pivots and the floating pivots are arranged in a trailing configuration where each of the fixed pivots is forward of the corresponding floating pivot in the forward direction of travel. The front wheel moves within an envelope during suspension compression and extension. The wheel opening allows clearance for the front wheel so that the front wheel does not contact the first arm during suspension compression and extension.

BRIEF DESCRIPTION OF THE DRAWINGS

FIG. 1A is a side view of a cycle including a front wheel suspension assembly constructed according to the teachings of the disclosure.

DETAILED DESCRIPTION

Figure 1B:
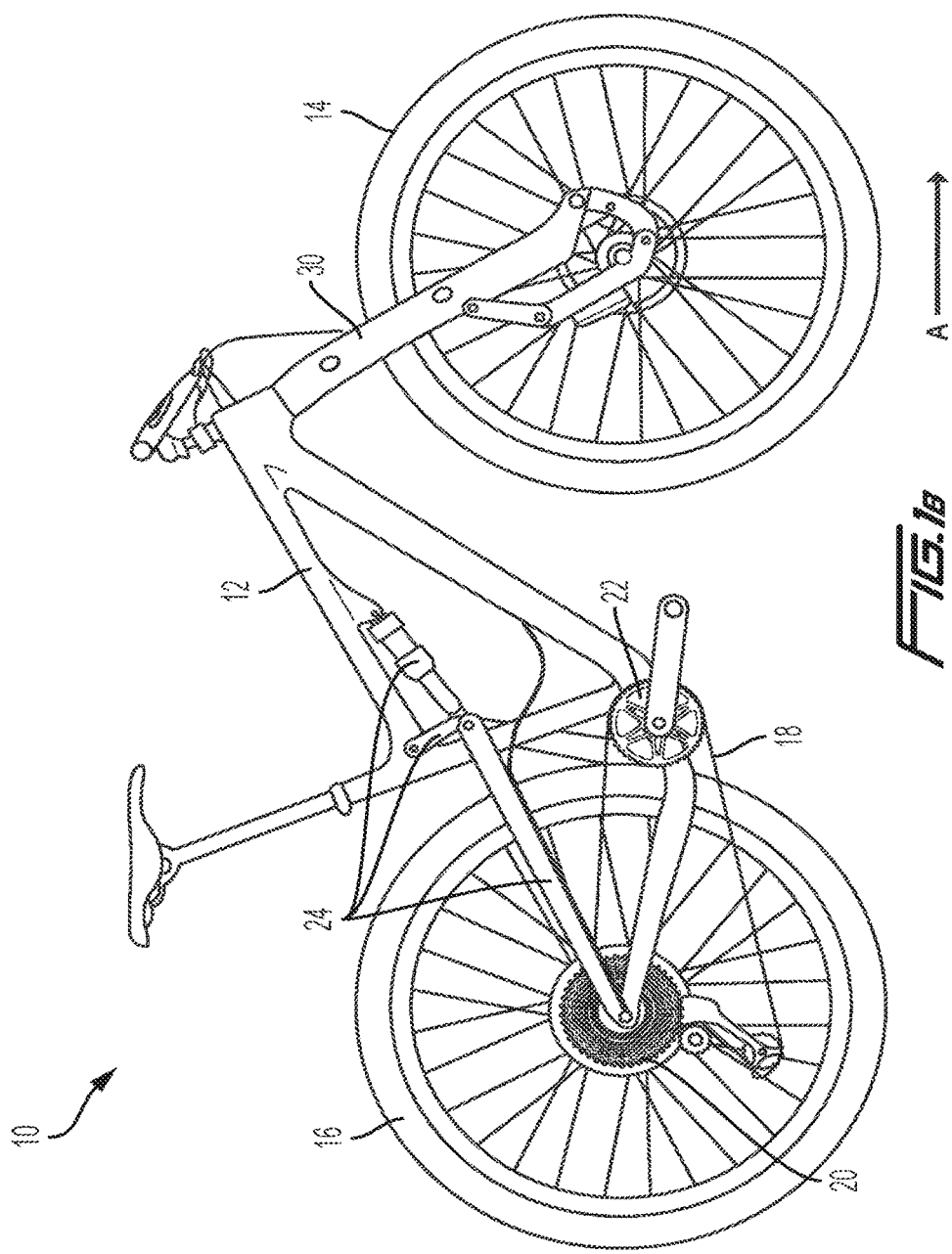
FIG. 1B is a side view of an alternate embodiment of a cycle including a front wheel suspension assembly constructed according to the teachings of the disclosure, the cycle of FIG. 1B including a rear wheel suspension assembly.

The present invention is not to be limited in scope by the specific embodiments described below, which are intended as exemplary illustrations of individual aspects of the invention. Functionally equivalent methods and components fall within the scope of the invention. Indeed, various modifications of the invention, in addition to those shown and described herein, will become apparent to those skilled in the art from the foregoing description. Such modifications are intended to fall within the scope of the appended claims. Throughout this application, the singular includes the plural and the plural includes the singular, unless indicated otherwise. The words "formed," "provided," "disposed," and "located," individually or in combination, are used to denote relative positioning in the instant description. All cited publications, patents, and patent applications are herein incorporated by reference in their entirety.

Turning now to FIG. 1A, a cycle 10 includes a frame 12, a front wheel 14, which in certain embodiments can include a rim and a tire, rotatably connected to a fork 30, and a rear wheel 16 rotatably connected to the frame 12. The rear wheel 16 is drivable by a drive mechanism, such as a chain 18 connected to a wheel sprocket 20 and to a chainring 22, so that driving force may be imparted to the rear wheel 16. The fork 30, allows the front wheel 14 to deflect relative to the frame 12 in response to ground conditions as a rider rides the cycle and to improve handling and control during riding. To improve handling characteristics, the fork 30 and the front wheel 14 may be operatively connected to a suspension assembly or linkage 46. The frame 12 may optionally include a rear wheel suspension assembly (not shown in FIG. 1A), which may allow the rear wheel 16 to deflect in response to ground conditions as a rider rides the cycle and to improve handling and control during riding.

Turning now to FIG. 1B, a cycle 10 includes a frame 12, a front wheel 14, which in certain embodiments can include a rim and a tire, rotatably connected to a fork 30, and a rear wheel 16 rotatably connected to the frame 12. The fork 30 and the front wheel 14 may be operatively connected to a suspension assembly or linkage 46. The rear wheel 16 is drivable by a drive mechanism, such as a chain 18 connected to a wheel sprocket 20 and to a chainring 22, so that driving force may be imparted to the rear wheel 16. The fork 30, allows the front wheel 14 to deflect relative to the frame 12 in response to ground conditions as a rider rides the cycle and to improve handling and control during riding. The frame 12 may optionally include a rear wheel suspension assembly 24, which may allow the rear wheel 16 relative to the frame 12 to deflect in response to ground conditions as a rider rides the cycle and to improve handling and control during riding.

As illustrated in FIGS. 2-4, 7A, and 7B, the fork 30 includes a first arm 32 and a second arm 33, each of which are operatively connected to a steering shaft 34. The steering shaft 34 includes a steering axis S that is formed by a central axis of the steering shaft 34. The first arm 32 has a first end 36 a second end 38, the first arm 32 including a first arm fixed pivot 40 and a first arm shock pivot 42. Similarly, the second arm 33 has a first end 37 and a second end 39, the second arm 33 including a second arm fixed pivot 140 and a second arm spring pivot 142.

The first arm shock pivot 42 operably connects a suspension device, such as a shock absorber 44 to the first arm 32. For example, the first arm shock pivot 42 allows relative motion, in this case rotation, between the shock absorber 44 and the first arm 32. In other embodiments, other types of relative motion, such as flexure or translation, between the shock absorber 44 and the first arm 32 may be employed. The first arm fixed pivot 40 pivotably connects one element of the linkage 46, as discussed further below, to the first arm 32.

Similarly, the second arm spring pivot 142 operably connects a suspension device, such as a spring unit 48 to the second arm 33. For example, the second arm spring pivot 142 allows relative motion, in this case rotation, between the spring unit 48 and the second arm 33. In other embodiments, other types of relative motion, such as flexure or translation, between the spring unit 48 and the second arm 33 may be employed. The second arm fixed pivot 140 pivotably connects one element of the linkage 46, as discussed further below, to the second arm 33.

A shock link 50 is pivotably connected to the first arm fixed pivot 40. The shock link 50 includes a shock link fixed pivot 52 and a shock link floating pivot 54 spaced apart from one another along a length of the shock link 50. The shock link 50 is pivotably connected to the first arm fixed pivot 40 at the shock link fixed pivot 52 such that the shock link 50 is rotatable about the shock link fixed pivot 52 and the shock link fixed pivot 52 remains in a fixed location relative to the first arm 32, while the shock link floating pivot 54 is movable relative to the first arm 32.

Similarly, a spring link 150 is pivotably connected to the second arm fixed pivot 140. The spring link 150 includes a spring link fixed pivot 152 and a spring link floating pivot 154 spaced apart from one another along a length of the spring link 150. The spring link 150 is pivotably connected to the second arm fixed pivot 140 at the spring link fixed pivot 152 such that the spring link 150 is rotatable about the spring link fixed pivot 152 and the spring link fixed pivot 152 remains in a fixed location relative to the second arm 33, while the spring link floating pivot 154 is movable relative to the second arm 33.

A pivot, as used herein, includes any connection structure that may be used to operatively connect one element to another element. An operative connection may allow for one component to move in relation to another while constraining movement in one or more degrees of freedom. For example, the one degree of freedom may be pivoting about an axis. In one embodiment, a pivot may be formed from a journal or through hole in one component and an axle in another component. In other examples, pivots may include ball and socket joints. Yet other examples of pivots include, but are not limited to singular embodiments and combinations of, compliant mounts, sandwich style mounts, post mounts, bushings, bearings, ball bearings, plain bearings, flexible couplings, flexure pivots, journals, holes, pins, bolts, and other fasteners. Also, as used herein, a fixed pivot is defined as a pivotable structure that does not change position relative the first arm 32. As used herein, a floating pivot is defined as a pivot that is movable (or changes position) relative to another element, and in this case, is movable relative to first arm 32.

The suspension assembly or linkage 46, 146 is configured in a trailing orientation. A trailing orientation is defined herein as a linkage that includes a fixed pivot that is forward of the corresponding floating pivot when the cycle is traveling in the forward direction of travel as represented by arrow A in FIGS. 1A and 1B. In other words, the floating pivot trails the fixed pivot when the cycle is traveling in the forward direction of travel. For example, in the illustrated embodiment, the shock link fixed pivot 52 is forward of the shock link floating pivot 54. The disclosed suspension assembly or linkage 46 is also characterized as a multi-bar linkage. A multi-bar linkage is defined herein as a linkage in which any part of the front wheel 14 is directly connected a link that is not directly connected to an arm of the fork 30.

The shock absorber 44 includes a first shock mount 56 and a second shock mount 58, the first shock mount 56 being pivotably connected to the first arm shock pivot 42, the second shock mount 58 being pivotably connected to a shock connection pivot 60 located between the shock link fixed pivot 52 and the shock link floating pivot 54 along a length of the shock link 50. The shock absorber 44 can also include a gas spring 92 having a spring body 88, a damper 94 having a damper body 89, an inshaft 80, and outshaft 90, a damper piston 83, a gas piston 81, and a shaft seal 85. In the art, a damper may also be referred to as a dashpot and a gas spring may also be referred to as a mechanical spring. The first shock mount 56 can be located at any point along the length of the spring body 88 or damper body 89. For example, the first shock mount 56 can be located closer to the inshaft 80 than a first end 87 of the spring body 88. The first shock mount 56 can comprise various types of pivot designs and layouts, such as through bolt pivots, trunnion mounts, clevises, or other types of pivots. The second shock mount 58 can be located at any point along the length of the inshaft 80. For example, the second shock mount 58 can be located closer to the damper 94 than a second end 97 of the inshaft 80. The second shock mount 58 can comprise various types of pivot designs and layouts, such as through bolt pivots, trunnion mounts, clevises, or other types of pivots. Although not shown by way of illustration, those skilled in the art would understand that the shock absorber 44 can be mounted with the first shock mount 56 attached to either the first arm 32 or the shock link 50 and/or with the second shock mount 58 attached to either the first arm 32 or the shock link 50. Shock absorber 44 mounting is not limited to the first shock mount 56 being attached to the first arm 32 and the second shock mount 58 being attached to the shock link 50 as illustrated in the accompanying figures.

The spring unit 48 includes a first spring mount 57 and a second spring mount 59, the first spring mount 57 being pivotably connected to the second arm spring pivot 142, the second spring mount 59 being pivotably connected to a spring connection pivot 160 located between the spring link fixed pivot 152 and the spring link floating pivot 154 along a length of the spring link 150. The spring unit 48 can also include a gas spring 192 having a spring body 188, an inshaft 180, a gas piston 181, a gas piston seal 191, and a shaft seal 185. In the art, a gas spring may also be referred to as a mechanical spring. The first spring mount 57 can be located at any point along the length of the spring body 188. For example, the first spring mount 57 can he located closer to the inshaft 180 than a first end 187 of the spring body 188. The first spring mount 57 can comprise various types of pivot designs and layouts, such as through bolt pivots, trunnion mounts, devises, or other types of pivots. The second spring mount 59 can be located at any point along the length of the inshaft 180. For example, the second spring mount 59 can be located closer to the spring body 188 than a second end 197 of the inshaft 180. The second spring mount 59 can comprise various types of pivot designs and layouts, such as through bolt pivots, trunnion mounts, clevises, or other types of pivots. Although not shown by way of illustration, those skilled in the art would understand that the spring unit 48 can be mounted with the first spring mount 57 attached to either the second arm 33 or the spring link 150 and/or with the second spring mount 59 attached to either the second arm 33 or the spring link 150. The spring unit 48 mounting is not limited to the first spring mount 57 being attached to the second arm 33 and the second spring mount 59 being attached to the spring link 150 as illustrated in the accompanying figures.

The inshafts 80, 180 and the outshaft 90 can comprise a singular component or plurality of components, and may be combined with other components. In some embodiments, the damper piston 83 may be connected to or include a portion or the entirety of the inshaft 80 or outshaft 90. In some embodiments, the damper piston 83 has a greater radial cross-sectional area than the inshaft 80 or the outshaft 90. The inshafts 80, 180 and the outshaft 90 can extend between and through a shaft seal 85, 185 to operably connect a gas spring 92 with a damper and/or to provide concurrent movement of any combination of the inshafts 80, 180, the outshaft 90, the gas pistons 81, 181, and the damper piston 83 during suspension compression and extension.

The damper piston mates to or includes a damper piston seal 93. In some embodiments, the damper piston seal 93 may comprise; multiple, or combinations of glide ring, wear band, o-ring. X-ring, Q ring, quad ring, Teflon seal, cap seal, piston ring, solid piston, T seal, V ring, U cup, urethane seal, PSQ seal, preloaded piston band, or other type of band or seal. The damper piston seal 93 is intended to seal damping fluid between each side of the damper piston 83, while allowing axial movement of the damper piston 83 and therefore axial movement of the inshaft 80 and/or outshaft 90.

In certain embodiments, the gas spring 92 has certain advantages over other types of springs. The gas spring 92 uses a pressurized gas such as air, nitrogen, or other gases to act on the area of a gas piston 81, which outputs a force at the gas piston 81. In certain embodiments, a user can change the gas pressure and therefore the force output at the gas piston 81. This allows the user to tailor output force based on their preference or to meet the requirements of varying road conditions. In certain embodiments, a gas spring 92 may comprise pressures that can act on both sides of the gas piston 81. By varying the volume of gas acting on each side of the gas piston 81 and the area of each side of the gas piston 81, one can vary the amount of force output at the gas piston 81 at various points in the damper displacement. This variability can be a valuable tool for allowing the user to tailor output force based on their preference or to meet the requirements of varying road conditions.

The gas piston 81, 181 can be connected to or include a portion or the entirety of the inshaft 80, 180 or the outshaft 90. In preferred embodiments, the gas piston 81, 181 has a greater radial cross-sectional area than the inshaft 80, 180 or the outshaft 90. In certain other preferred embodiments, the gas piston 81 has a greater radial cross-sectional area than the damper piston 83. The gas piston 81, 181 mates to or includes a gas piston seal 91, 191. In some embodiments, the gas piston seal 91, 191 may comprise; singular, multiple, or combinations of glide ring, wear band, o-ring. X-ring, Q ring, quad ring, Teflon seal, cap seal, piston ring, solid piston, T seal, V ring, U cup, urethane seal, PSQ seal, preloaded piston band, or other type of band or seal. The gas piston seal 91, 191 is intended to seal gas between each side of the gas piston 81, 181, while allowing axial movement of the gas piston 81, 181 and therefore axial movement of the inshaft 80, 180 and/or outshaft 90.

The shock absorber 44 includes a shaft seal 85. The shaft seal 45 is used to seal damping fluid or gas inside the damper body 89 or spring body 88 while allowing axial movement of an inshaft 80 and/or outshaft 90. The shaft seal 85 can be located at one end of a spring body 88, while sealing gas inside the spring body 88 and allowing axial movement of an inshaft 80 or outshaft 90. A shaft seal 45 can be located at one or more ends of a damper body 89, while sealing damping fluid inside the damper body 89 and allowing axial movement of an inshaft 80 or outshaft 90.

Similarly, the spring unit 48 includes a shaft seal 185. The shaft seal 185 is used to seal fluid or gas inside the spring body 188 while allowing axial movement of the inshaft 180. The shaft seal 185 can be located at one end of a spring body 188, while scaling gas inside the spring body 188 and allowing axial movement of an inshaft 180. The shaft seal 185 can be located at one or more ends of the spring body 188, while sealing damping fluid inside the spring body 188 and allowing axial movement of the inshaft 180.

A first wheel carrier 62 includes a wheel carrier first pivot 64 and a wheel carrier second pivot 66 spaced apart from one another along a length of the wheel carrier 62. Both the wheel carrier first pivot 64 and the wheel carrier second pivot 66 arc floating pivots, as they both move relative to the first arm 32. A wheel mount 68 is adapted to be connected to a center of a wheel, for example the front wheel 14. In the disclosed embodiment, a center of the front wheel 14 is rotatably connected to the wheel mount 68. The wheel carrier first pivot 64 is pivotably connected to the shock link floating pivot 54 so that the wheel carrier second pivot 66 is pivotable about the wheel carrier first pivot 64 relative to the shock link floating pivot 54. A wheel carrier, in some embodiments, can include one or more brake mounts.

Similarly, a second wheel carrier 162 includes a wheel carrier first pivot 164 and a wheel carrier second pivot 166 spaced apart from one another along a length of the wheel carrier 162. Both the wheel carrier first pivot 164 and the wheel carrier second pivot 166 are floating pivots, as they both move relative to the first arm 32. A wheel mount 168 is adapted to be connected to a center of a wheel, for example the front wheel 14. In the disclosed embodiment, a center of the front wheel 14 is rotatably connected to the wheel mount 168. The wheel carrier first pivot 164 is pivotably connected to the spring link floating pivot 154 so that the wheel carrier second pivot 166 is pivotable about the wheel carrier first pivot 164 relative to the spring link floating pivot 154. A wheel carrier, in some embodiments, can include one or more brake mounts 163.

A first control link 70 includes a control link floating pivot 72 and a control link fixed pivot 74. The control link floating pivot 72 is pivotably connected to the wheel carrier second pivot 66, and the control link fixed pivot 74 is pivotably connected to a first arm control pivot 76 located on the first arm 32 such that the control link floating pivot 72 is pivotable about the control link fixed pivot 74, which remains in a fixed location relative to the first arm control pivot 76.

Similarly, a second control link 170 includes a control link floating pivot 172 and a control link fixed pivot 174. The control link floating pivot 172 is pivotably connected to the wheel carrier second pivot 166, and the control link fixed pivot 174 is pivotably connected to a second arm control pivot 176 located on the second arm 33 such that the control link floating pivot 172 is pivotable about the control link fixed pivot 174, which remains in a fixed location relative to the second arm control pivot 176.

Figure 2A:
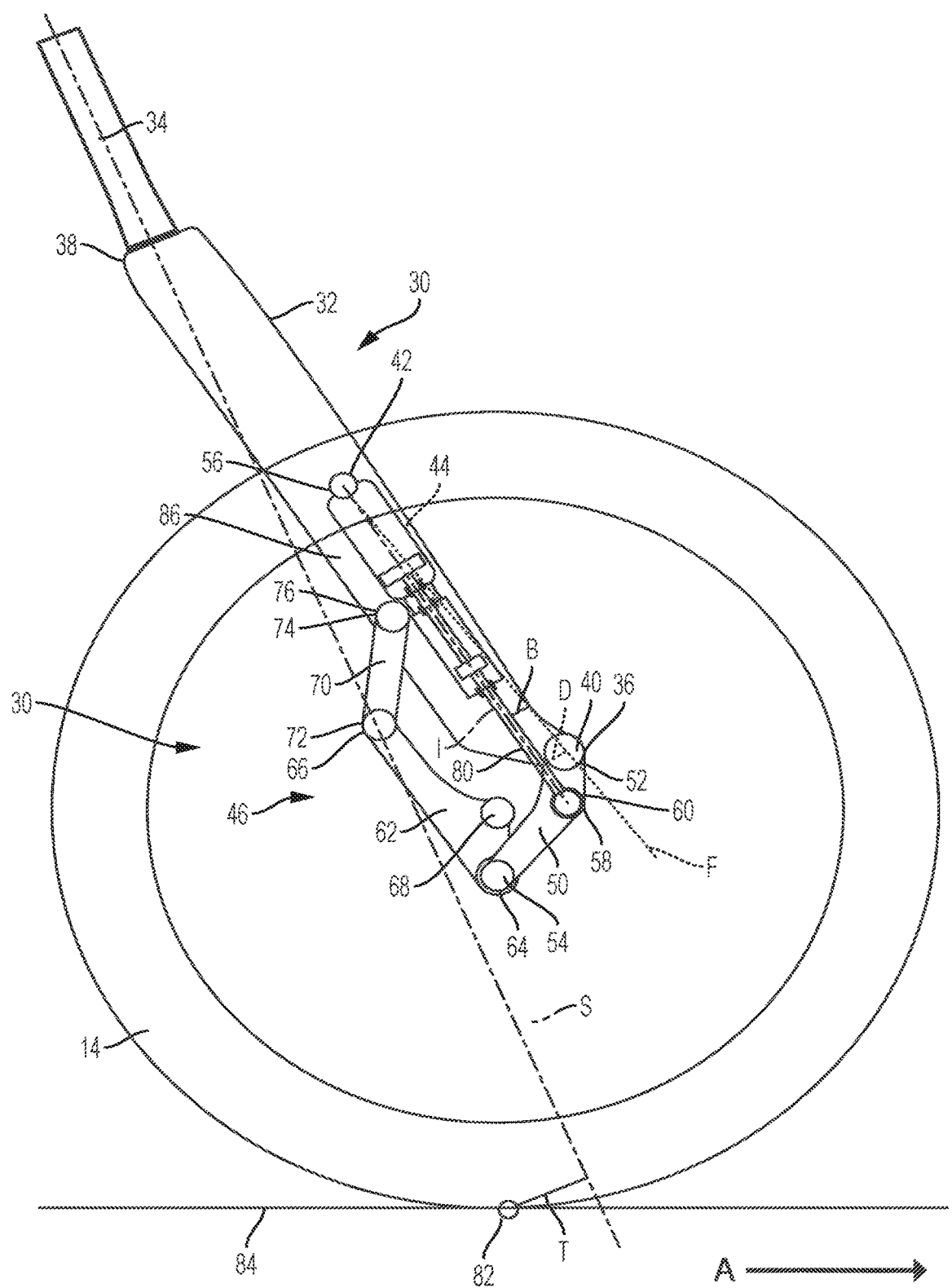
FIG. 2A is a close up side view of a first arm of the front wheel suspension assembly of FIG. 1.

In some embodiments, the shock connection pivot 60 is closer to the shock link fixed pivot 52 than to the shock link floating pivot 54, as illustrated in FIG. 2A. As a function of suspension compression and link movement, a perpendicular distance D between a central axis I of an inshaft 80 of the shock absorber 44 or spring unit 48 and a center of the shock link fixed pivot 52 varies as the shock absorber 44 is compressed and extended, as the shock absorber pivots about the first shock mount 56. This pivoting and varying of the perpendicular distance D allows the leverage ratio and motion ratio to vary as the shock absorber 44 compresses and extends. As a function of suspension compression and link movement, a mechanical trail distance T varies as the shock absorber 44 compresses and extends. The mechanical trail distance T is defined as the perpendicular distance between the steering axis S and the contact point 82 of the front wheel 14 with the ground 84. More specifically, as the suspension compresses, beginning at a state of full extension, the mechanical trail distance T increases, thus increasing stability during compression. Compression is usually experienced during braking, cornering, and shock absorbing, all of which benefit from increased stability that results from the mechanical trail distance increase.

Mechanical trail (or "trail", or "caster") is an important metric relating to handling characteristics of two-wheeled cycles. Mechanical trail is a configuration in which the wheel is rotatably attached to a fork, which has a steering axis that is offset from the contact point of the wheel with the ground. When the steering axis is forward of the contact point, as in the case of a shopping cart, this configuration allows the caster wheel to follow the direction of cart travel. If the contact point moves forward of the steering axis (for example when reversing direction of a shopping cart), the directional control becomes unstable and the wheel spins around to the original position in which the contact point trails the steering axis. The friction between the ground and the wheel causes a self-righting torque that tends to force the wheel to trail the steering axis. The greater the distance between the contact point and perpendicular to the steering axis, the more torque is generated, and the greater the stability of the system. Similarly, the longer the distance between the cycle wheel contact point and perpendicular to the steering axis, the more torque is generated, and the greater the stability of the system. Conversely, the shorter the distance between the cycle wheel contact point and perpendicular to the steering axis, the less torque is generated, and the lower the stability of the system.

This caster effect is an important design characteristic in cycles. Generally, the caster effect describes the cycle rider's perception of stability resulting from the mechanical trail distance described above. If the wheel gets out of line, a self-aligning torque automatically causes the wheel to follow the steering axis again due to the orientation of the wheel ground contact point being behind the steering axis of the fork. As the contact point of the wheel with the ground is moved further behind the steering axis, self aligning torque increases. This increase in stability is referred to herein as the caster effect.

In the disclosed wheel suspension assembly, when the suspension is at a state of full extension, the steering axis of the fork 30 projects ahead of the contact point 82. As the suspension assembly moves towards a state of full compression, the steering axis S projects farther ahead of the contact point 82, which results in the stability increasing. This increased stability stands in contrast to known telescopic fork cycles, which experience reduced trail and thus reduced stability during compression.

Leverage ratios or motion ratios are important metrics relating to performance characteristics of some suspensions. In certain embodiments, a shock absorber can be compressed at a constant or variable rate as the suspension moves at a constant rate towards a state of full compression. As a wheel is compressed, incremental suspension compression distance measurements are taken. Incremental suspension compression distance is measured from the center of the wheel at the wheel rotation axis and parallel with the steering axis, starting from a state of full suspension extension, and moving towards a state of full suspension compression. These incremental measurements are called the incremental suspension compression distance. A shock absorber length can be changed by wheel link, and/or brake link, and/or control link movements as the suspension compresses. At each incremental suspension compression distance measurement, a shock absorber length measurement is taken. The relationship between incremental suspension compression distance change and shock absorber length change for correlating measurements of the suspension's compression is called leverage ratio or motion ratio. Leverage ratio and motion ratio are effectively equivalent but mathematically different methods of quantifying the effects of variable suspension compression distance versus shock compression distance. Overall leverage ratio is the average leverage ratio across the entire range of compression. Overall leverage ratio can be calculated by dividing the total suspension compression distance by the total shock absorber compression distance. Overall motion ratio is the average motion ratio across the entire range of compression. Overall motion ratio can be calculated by dividing the total shock absorber compression distance by the total suspension compression distance.

Generally, a suspended wheel has a compressible wheel suspension travel distance that features a beginning travel state where the suspension is completely uncompressed to a state where no further suspension extension can take place, and an end travel state where a suspension is completely compressed to a state where no further suspension compression can take place. At the beginning of the wheel suspension travel distance, when the suspension is in a completely uncompressed state, the shock absorber is in a state of least compression, and the suspension is easily compressed. As the suspended wheel moves compressively, force at the wheel changes in relation to shock absorber force multiplied by a leverage ratio. A leverage ratio is defined as the ratio of compressive wheel travel change divided by shock absorber measured length change over an identical and correlating given wheel travel distance. A motion ratio is defined as the ratio of shock absorber measured length change divided by compressive wheel travel change over an identical and correlating given wheel travel distance.

As stated above, in known telescopic forks no leverage ratio exists and, the leverage ratio is always equivalent to 1:1 due to the direct coupling of the wheel to the shock absorber.

A leverage ratio curve is a graphed quantifiable representation of leverage ratio versus wheel compression distance or percentage of full compression distance. Wheel compression distance, suspension compression, or wheel travel is measured from the center of the wheel at the wheel rotation axis and parallel with the steering axis, with the initial 0 percent measurement taken at full suspension extension with the vehicle unladen. As a suspension is compressed from a state of full extension to a state of full compression at a constant rate, measurements of shock absorber length are taken as the shortest distance between a first shock pivot and a second shock pivot at equal increments of suspension compression. When graphed as a curve on a Cartesian graph, leverage ratio is shown on the Y axis escalating from the x axis in a positive direction, and vertical wheel travel is shown on the X axis escalating from the Y axis in a positive direction.

A motion ratio curve is a graphed quantifiable representation of motion ratio versus wheel compression distance or percentage of full compression distance. Wheel compression distance, suspension compression, or wheel travel is measured from the center of the wheel at the wheel rotation axis and parallel with the steering axis, with the initial 0 percent measurement taken at full suspension extension with the vehicle unladen. As a suspension is compressed from a state of full extension to a state of full compression, measurements of shock absorber length are taken as the shortest distance between a first shock pivot and a second shock pivot at equal increments of suspension compression. When graphed as a curve on a Cartesian graph, motion ratio is shown on the Y axis escalating from the x axis in a positive direction, and vertical wheel travel is shown on the X axis escalating from the Y axis in a positive direction.

In certain embodiments, a leverage ratio or motion ratio curve can be broken down into three equal parts in relation to wheel compression distance or vertical wheel travel, a beginning ⅓ (third), a middle ⅓, and an end ⅓. In certain embodiments, a beginning ⅓ can comprise a positive slope, zero slope, and or a negative slope. In certain embodiments, a middle ⅓ can comprise a positive slope, zero slope, and or a negative slope. In certain embodiments, an end ⅓ can comprise a positive slope, zero slope, and or a negative slope. Certain preferred leverage ratio embodiments can comprise a beginning ⅓ with a positive slope, a middle ⅓ with a less positive slope, and an end ⅓ with a more positive slope. Certain preferred leverage ratio embodiments can comprise a beginning ⅓ with a negative slope, a middle ⅓ with negative and zero slope, and an end ⅓ with a positive slope. Certain preferred leverage ratio embodiments can comprise a beginning ⅓ with a positive and negative slope, a middle ⅓ with negative and zero slope, and an end ⅓ with a positive slope. Certain preferred leverage ratio embodiments can comprise a beginning ⅓ with a positive and negative slope, a middle ⅓ with negative and zero slope, and an end ⅓ with a more negative slope. Certain preferred motion ratio embodiments can comprise a beginning ⅓ with a negative slope, a middle ⅓ with a less negative slope, and an end ⅓ with a more negative slope. Certain preferred motion ratio embodiments can comprise a beginning ⅓ with a positive slope, a middle ⅓ with positive and zero slope, and an end ⅓ with a negative slope. Certain preferred motion ratio embodiments can comprise a beginning ⅓ with a negative and positive slope, a middle ⅓ with positive and zero slope, and an end ⅓ with a negative slope. Certain preferred motion ratio embodiments can comprise a beginning ⅓ with a negative and positive slope, a middle ⅓ with positive and zero slope, and an end ⅓ with a more positive slope.

In contrast to telescopic suspensions, the disclosed wheel suspension assembly provides a greater than 1:1 overall leverage ratio between the shock absorber 44 and the shock link 50, due to the indirect coupling (through the linkage 46) of the wheel 14 and the shock absorber 44. In contrast to telescopic suspensions, the disclosed wheel suspension assembly provides a less than 1:1 overall motion ratio between the shock absorber 44 and the shock link 50, due to the indirect coupling (through the linkage 46) of the wheel 14 and the shock absorber 44. Additionally, because of the movement arcs of the various linkage elements, at any given point during compression, instantaneous leverage ratio and motion ratio can vary non-linearly.

The central axis I of the inshaft 80 of the shock absorber 44 is arranged to form an angle B of between 0° and 20° relative to a central axis F of the first arm 32, the central axis F of the first arm 32 being defined by a line formed between the first arm shock pivot 42 and the first arm fixed pivot 40.

In other embodiments, the central axis I of the inshaft 80 of the shock absorber 44 forms an angle with the central axis F of the first arm 32 of between 0° and 15°. In other embodiments, the central axis I of the inshaft 80 of the shock absorber 44 forms an angle with the central axis F of the first arm 32 of between 0° and 30°. The angle B may vary within these ranges during compression and extension.

In some embodiments, the first arm 32 includes a hollow portion 86 and the shock absorber 44 is located at least partially within the hollow portion 86 of the first arm 32.

The shock link fixed pivot 52 is offset forward of the central axis I of the inshaft 80 of the shock absorber 44. In other words, the central axis I of the inshaft 80 of the shock absorber 44 is positioned between the shock link fixed pivot 52 and the shock link floating pivot 54 in a plane defined by the central axis I of the inshaft 80, the shock link fixed pivot 52 and the shock link floating pivot 54 (i.e., the plane defined by the view of FIGS. 2A and 2B).

Figure 2B:
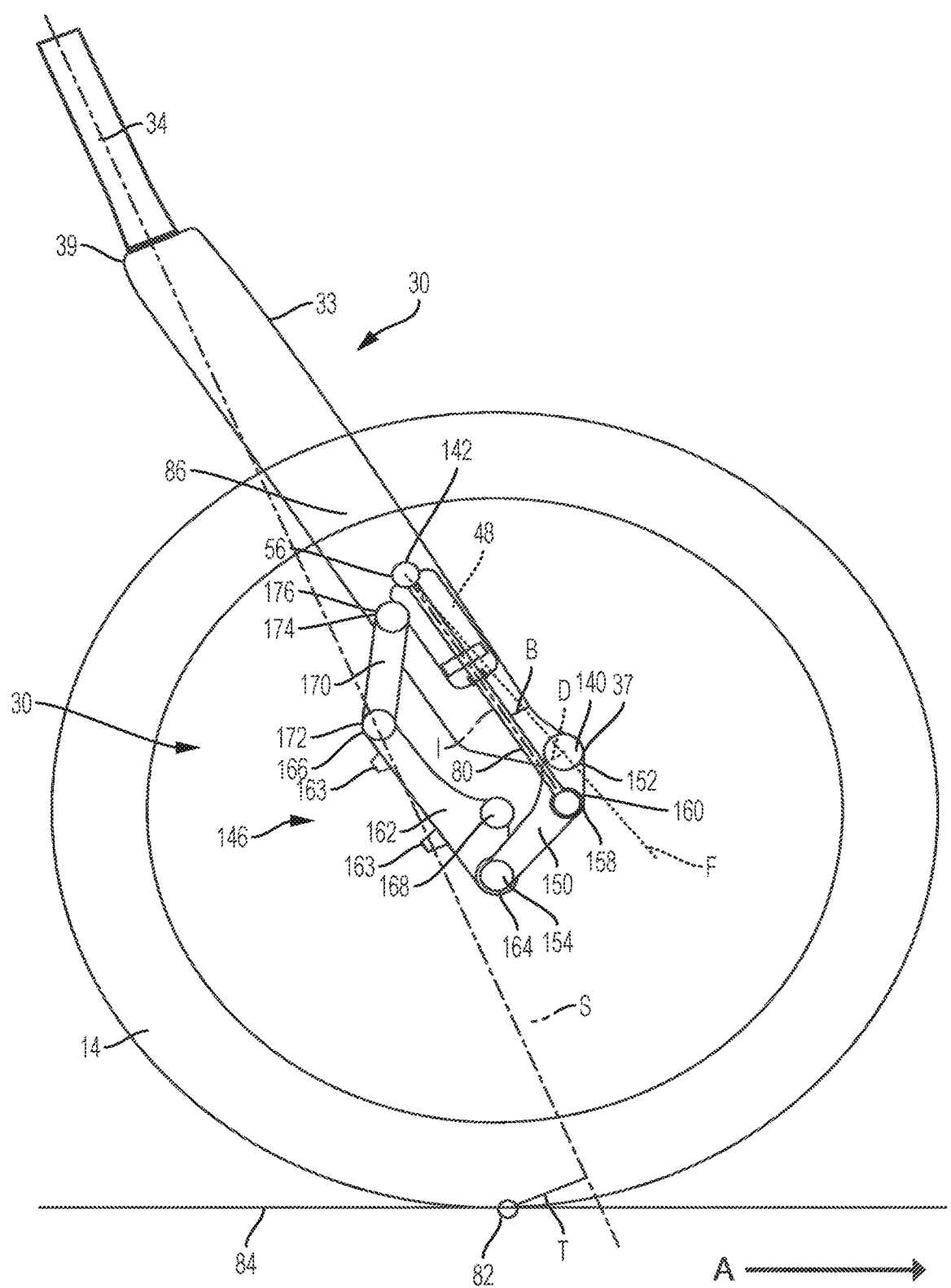
FIG. 2B is a close up side view of a second arm of the front wheel suspension assembly of FIG. 1.
Figure 3A:
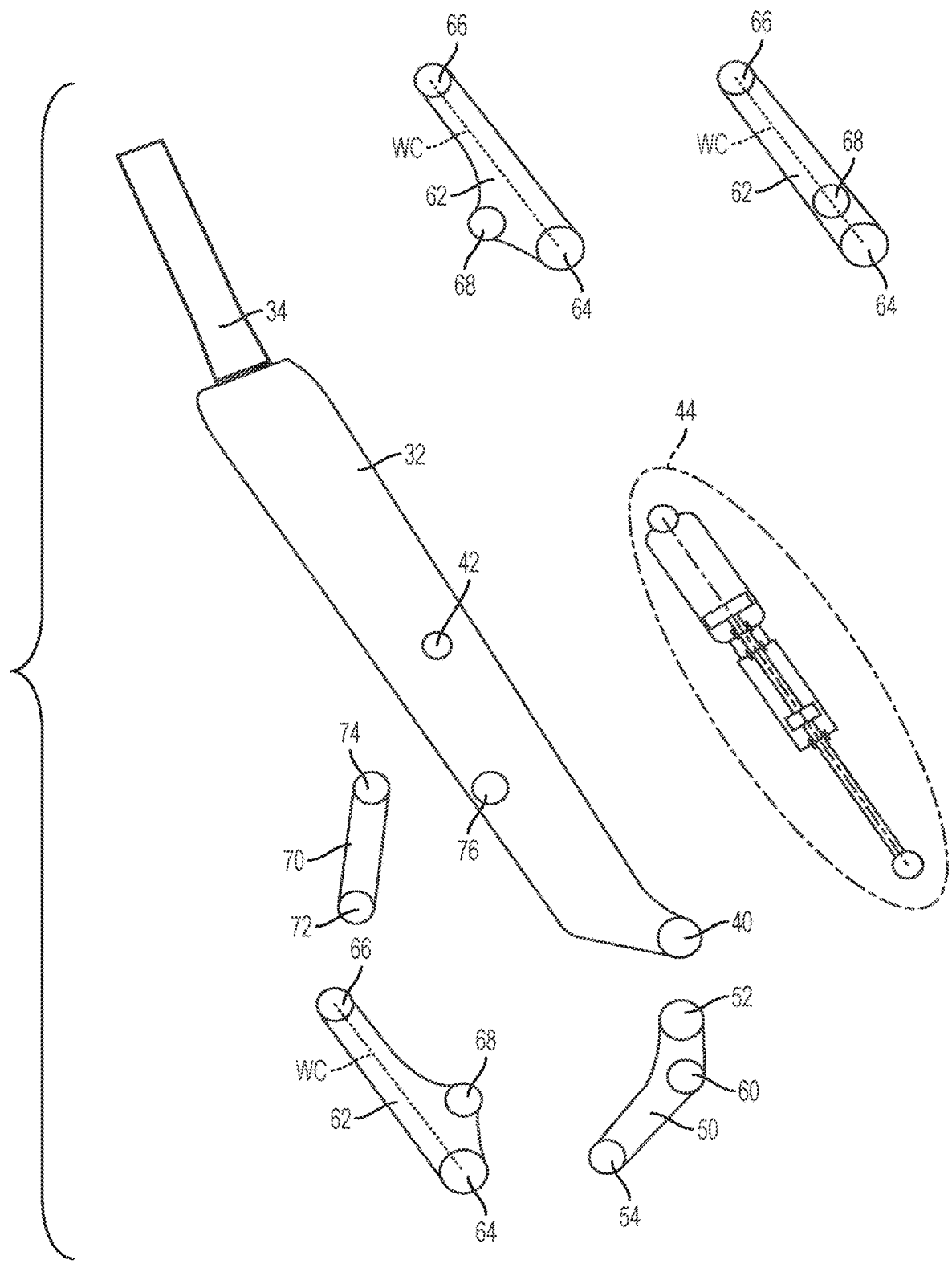
FIG. 3A is a side exploded view of the front wheel suspension assembly of FIG. 2A.
Figure 3B:
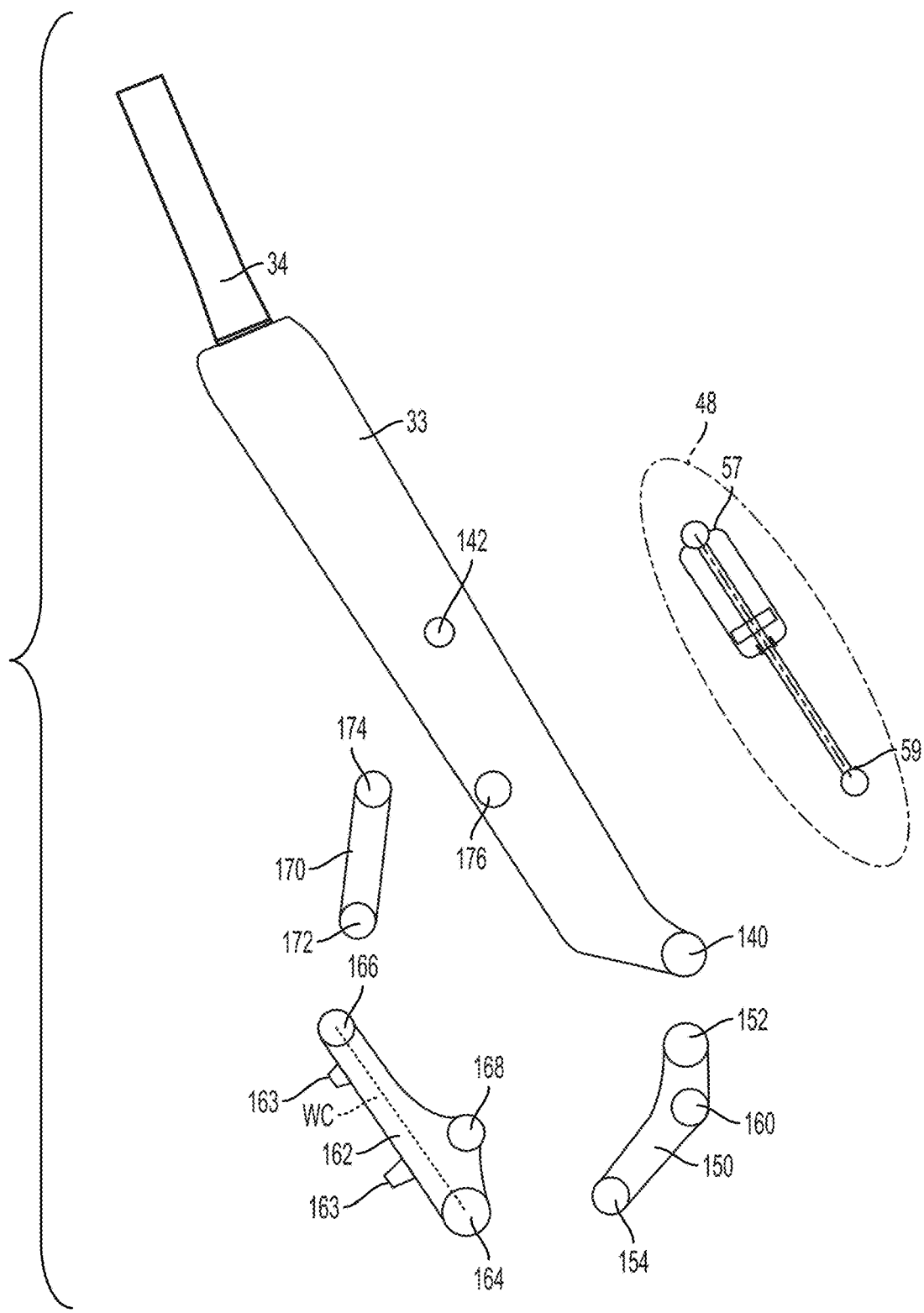
FIG. 3B is a side exploded view of the front wheel suspension assembly of FIG. 2B.

A line between the wheel carrier first pivot 64 and the wheel carrier second pivot 66 defines a wheel carrier axis WC, and the wheel mount 68 is offset from the wheel carrier axis WC in a plane defined by the wheel carrier axis WC and the wheel mount 68 (i.e., the plane defined by the views of FIG. 3A and 3B). In some embodiments, the wheel mount 68 is offset from the wheel carrier axis WC towards the first arm 32, for example the embodiment illustrated in FIGS. 2 and 3. In other embodiments, the wheel mount 68 may be offset from the wheel carrier axis WC away from the first arm 32.

In the embodiment of FIGS. 2A, 2B, 3A and 3B, the wheel mount 68, 168 is located aft of the shock link fixed pivot 52, or of the spring link fixed pivot 152, such that the central axis I of the inshaft 80, 180 of the shock absorber 44 or of the spring unit 48 is located between the wheel mount 68, 168 and the shock link fixed pivot 52, or the spring link fixed pivot 152 in a plane defined by the central axis I of the inshaft 80, 188, the wheel mount 68, 168 and the shock link fixed pivot 52, or the spring link fixed pivot 152 (i.e., the plane defined by the views of FIGS. 2A and 2B).

Figure 4A:
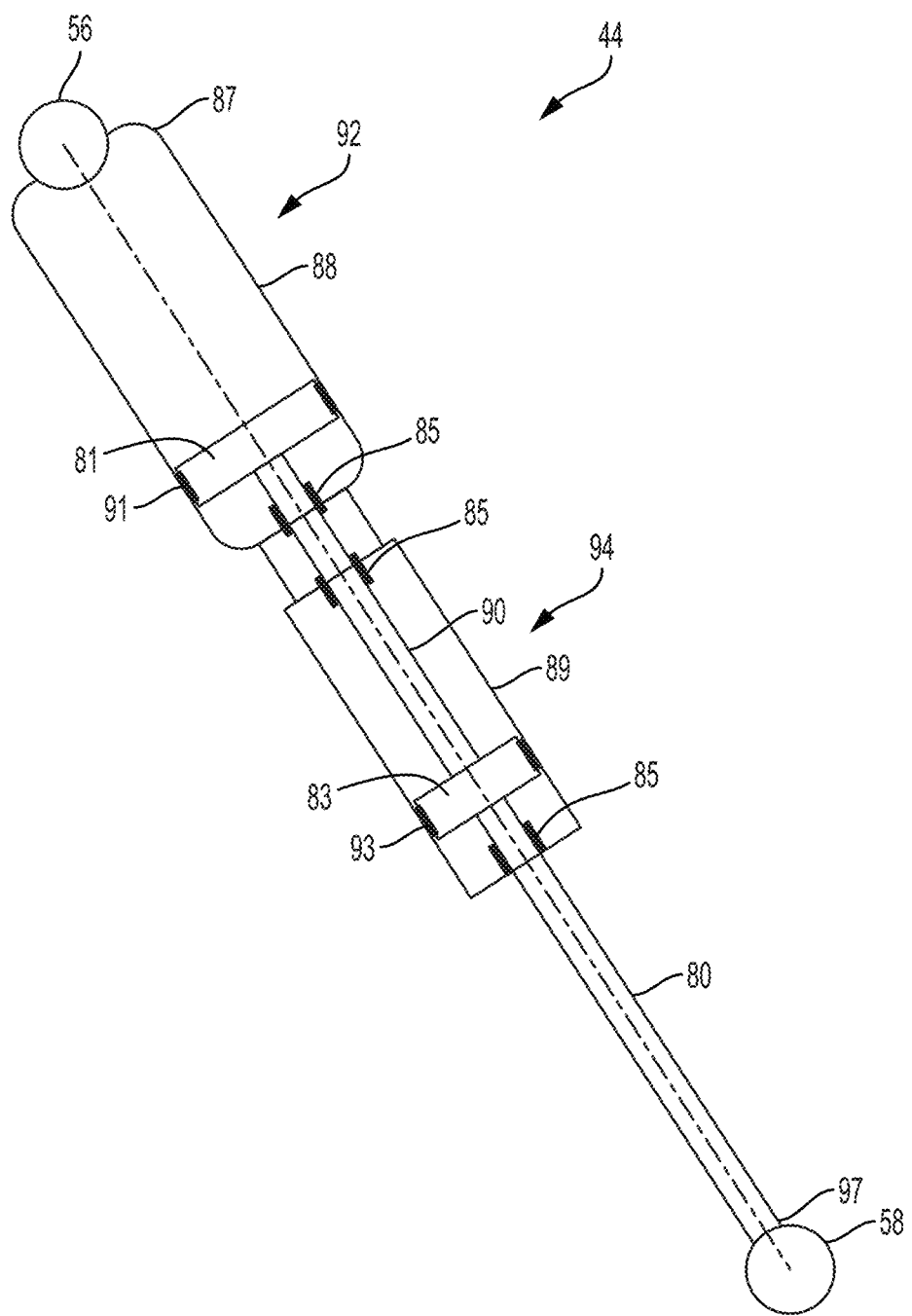
FIG. 4A is a side cut-away view of a first embodiment of a shock absorber of the wheel suspension assembly of FIG. 2A.

Turning now to FIG. 4A, the shock absorber 44 may include an inline shock absorber having a damper body 89 and a spring body 88 that are sequentially arranged along a substantially common central axis.

The damper body 89 and the spring body 88 shall be considered to be inline and arranged sequentially along a substantially common central axis when a central axis of the spring body 88 and a central axis of the damper body 89 are offset from one another by a maximum of 100% of the outside diameter of an inshaft 80. In other embodiments, the damper body 89 and the spring body 88 are offset from one another by a maximum of 50% of the outside diameter of the inshaft 80. In other embodiments, the damper body 89 and the spring body 88 are offset from one another by a maximum of 33% of the outside diameter of the inshaft 80. In yet other embodiments, the damper body 89 and the spring body 88 are offset from one another by a maximum of 25% of the outside diameter of the inshaft 80. In a preferred embodiment, the damper body 89 and the spring body 88 share a common central axis.

The inshaft 80 extends from the damper body 89, and an outshaft 90 extends into the damper body 89 and into the spring body 88. The second shock mount 58 is formed at one end of the inshaft 80, and the inshaft 80 is pivotably connected to the shock connection pivot 60 by the second shock mount 58 such that the inshaft 80 and the outshaft 90 are compressible and extendable relative to the damper body 89 as the shock link 50 pivots about the shock link fixed pivot 52. In the embodiments of FIG. 4A, the damper body 89 is located between the spring body 88 and the second shock mount 58.

The shock absorber 44 includes a gas piston 81 with a larger radial cross-sectional area than a damper piston 83. The shock absorber 44 includes a shaft seal 85. The shaft seal 85 is used to seal damping fluid or gas inside the damper body 89 and/or inside the spring body 88 while allowing axial movement of an inshaft 80 and/or outshaft 90. The shaft seal 85 can be located at one end of a spring body 88, while sealing gas inside the spring body 88 and allowing axial movement of an outshaft 90. The shaft seal 85 can be located at one end of a damper body 89, while sealing damping fluid inside the damper body 89 and allowing axial movement of an outshaft 90. The shaft seal 85 can be located at one end of a damper body 89, while sealing damping fluid inside the damper body 89 and allowing axial movement of an inshaft 80. The shock absorber 44 may include one or any combination of shaft seals 85 at the locations described above.

Figure 4B:
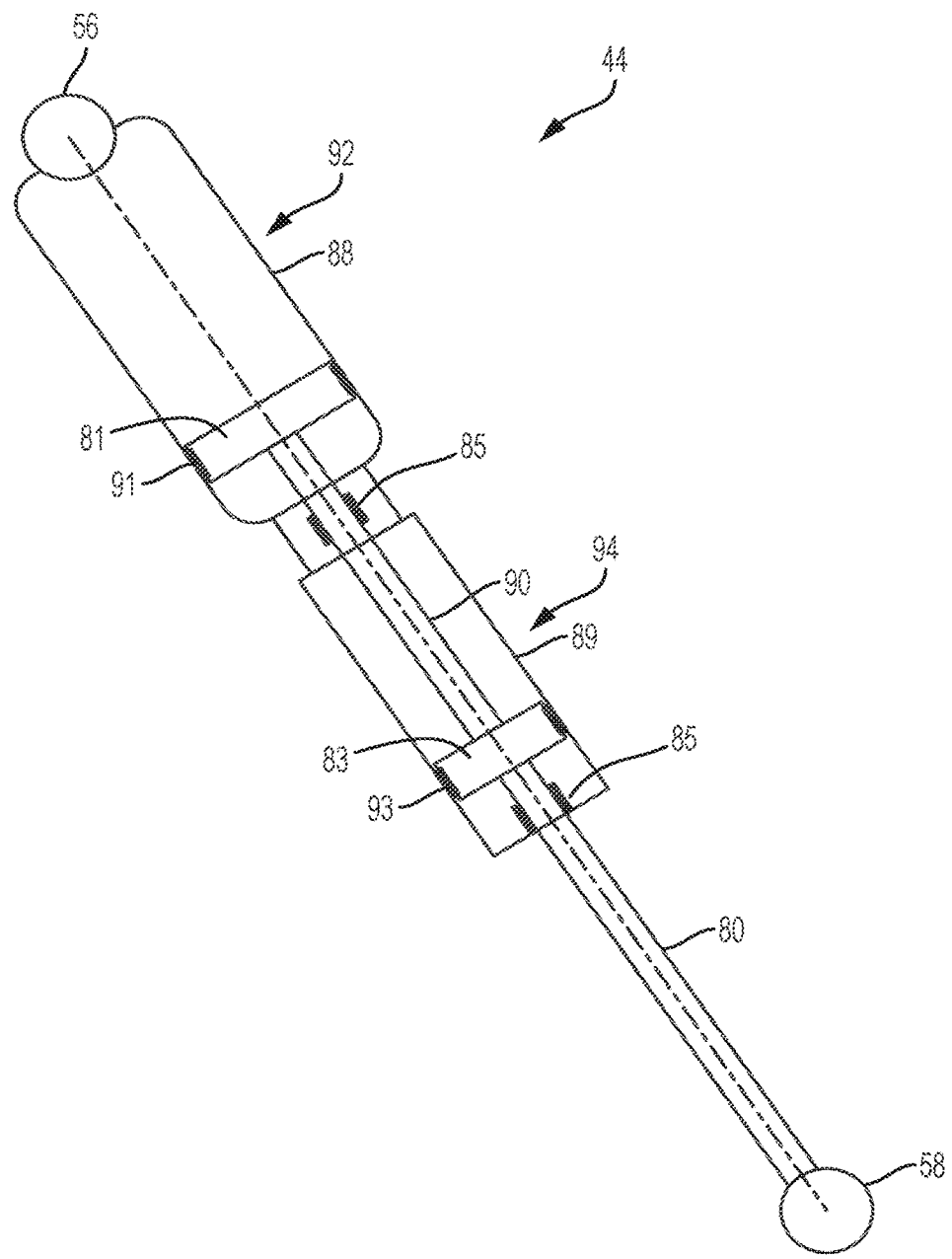
FIG. 4B is a side cut-away view of a second embodiment of a shock absorber of the wheel suspension assembly of FIG. 2A.

Turning now to FIG. 4B, the shock absorber 44 may include an inline shock absorber having a damper body 89 and a spring body 88 that are sequentially arranged along a substantially common central axis. The shock absorber may further include an inshaft 80 that extends from the damper body 89, and an outshaft 90 that extends into the damper body 89 and into the spring body 88. The second shock mount 58 is formed at one end of the inshaft 80, and the inshaft 80 is pivotably connected to the shock connection pivot 60 by the second shock mount 58 such that the inshaft 80 and the outshaft 90 are compressible and extendable relative to the damper body 89 as the shock link 50 pivots about the shock link fixed pivot 52. In the embodiments of FIG. 4B, the damper body 89 is located between the spring body 88 and the second shock mount 58.

The shock absorber 44 includes a gas piston 81 with a larger radial cross-sectional area than a damper piston 83. The shock absorber 44 includes a shaft seal 85. The shaft seal 85 is used to seal damping fluid or gas inside the damper body 89 and/or the spring body 88 while allowing axial movement of an inshaft 80 and/or outshaft 90. The shaft seal 85 can be located at one end of a spring body 88, while sealing gas inside the spring body 88 and allowing axial movement of an outshaft 90. The shaft seal 85 can be located at one end of a spring body 88, while sealing gas inside the spring body 88, and additionally sealing damping fluid inside the damper body 89, and allowing axial movement of an outshaft 90. The shaft seal 85 can be located at one end of a damper body 89, while sealing damping fluid inside damper body 89 and allowing axial movement of an inshaft 80. The shock absorber 44 may include one or any combination of shaft seals 85 at the locations described above.

Figure 4C:
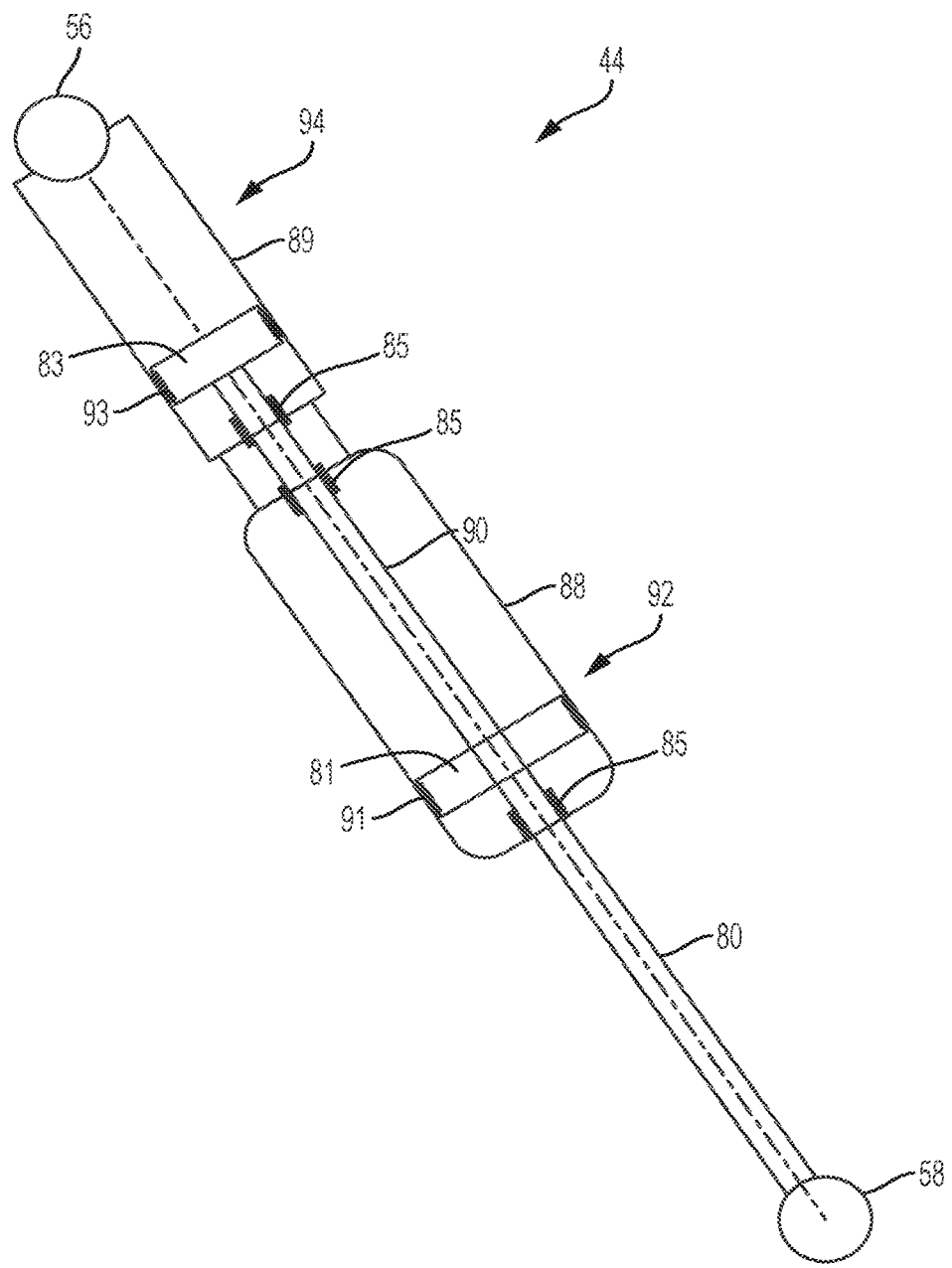
FIG. 4C is a side cut-away view of a third embodiment of a shock absorber of the wheel suspension assembly of FIG. 2A.

Turning now to FIG. 4C, the shock absorber 44 may include an inline shock absorber having a spring body 88 and a damper body 89 that are sequentially arranged along a substantially common central axis. The shock absorber may further include an inshaft 80 that extends from the spring body 88, and an outshaft 90 that extends into the damper body 89 and into the spring body 88. The second shock mount 58 is formed at one end of the inshaft 80, and the inshaft 80 is pivotably connected to the shock connection pivot 60 by the second shock mount 58 such that the inshaft 80 and the outshaft 90 are compressible and extendable relative to the spring body 88 as the shock link 50 pivots about the shock link fixed pivot 52. The embodiment of FIG. 4C differs from the embodiment of FIG. 4A in that the spring body 88 is between the damper body 89 and the second shock mount 58. In the embodiments of FIG. 4A, the damper body 89 was located between the spring body 88 and the second shock mount 58.

The shock absorber 44 includes a gas piston 81 with a larger radial cross-sectional area than a damper piston 83. The shock absorber 44 includes a shaft seal 85. The shaft seal 85 is used to seal damping fluid or gas inside the spring body 88 and/or the damper body 89 while allowing axial movement of an inshaft 80 and/or outshaft 90. The shaft seal 85 can be located at one end of a damper body 89, while sealing damping fluid or gas inside the damper body 89 and allowing axial movement of an outshaft 90. The shaft seal 85 can be located at one end of a spring body 88, while sealing gas inside the spring body 88 and allowing axial movement of an outshaft 90. The shaft seal 85 can be located at one end of a spring body 88, while sealing gas inside the spring body 88 and allowing axial movement of an inshaft 80.

Figure 4D:
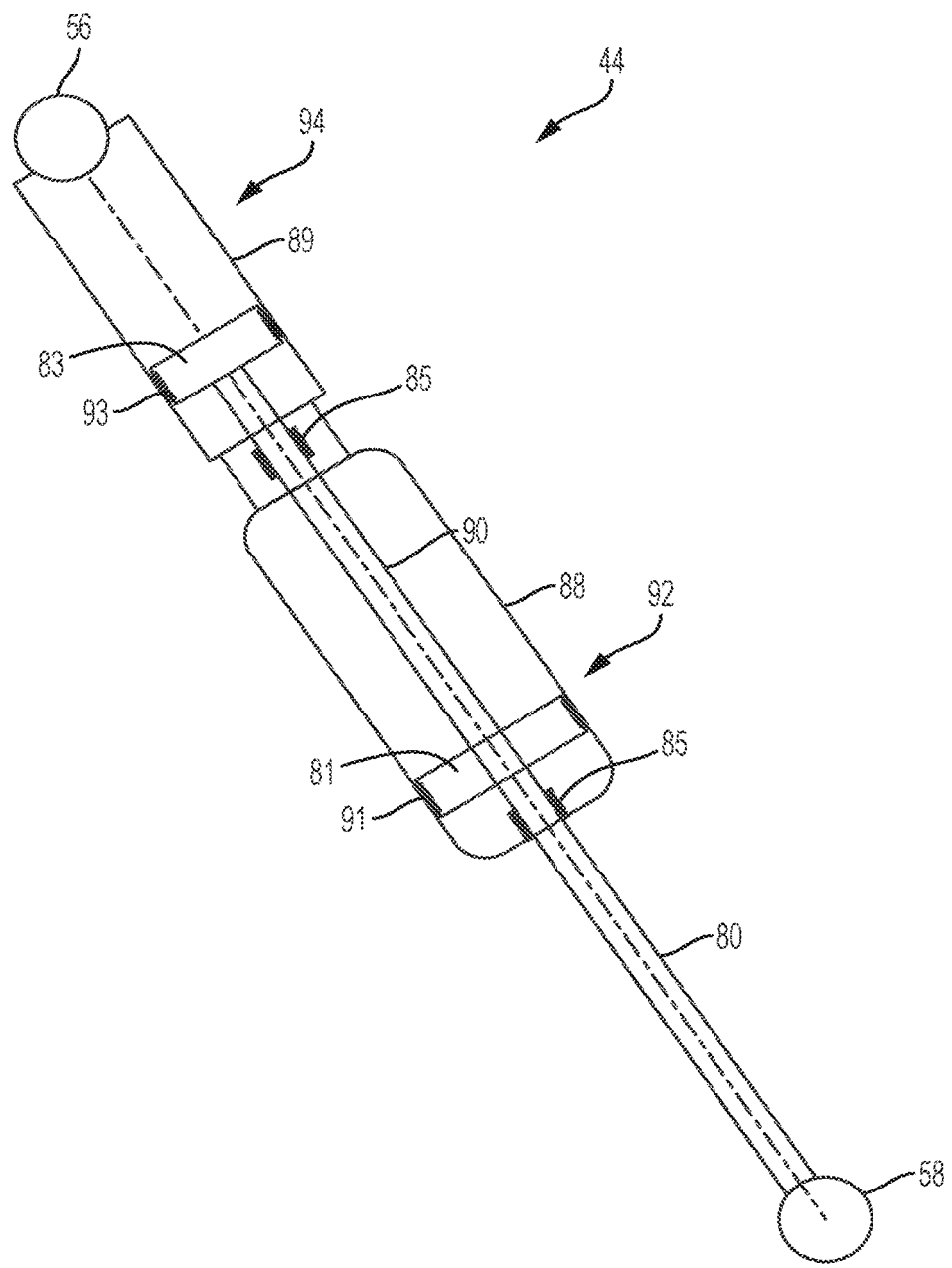
FIG. 4D is a side cut-away view of a fourth embodiment of a shock absorber of the wheel suspension assembly of FIG. 2A.

Turning now to FIG. 4D, the shock absorber 44 may include an inline shock absorber having a spring body 88 and a damper body 89 that are sequentially arranged along a substantially common central axis. The shock absorber may further include the inshaft 80 that extends from the spring body 88, and an outshaft 90 that extends into the damper body 89 and into the spring body 88. The second shock mount 58 is formed at one end of the inshaft 80, and the inshaft 80 is pivotably connected to the shock connection pivot 60 by the second shock mount 58 such that the inshaft 80 and the outshaft 90 are compressible and extendable relative to the spring body 88 as the shock link 50 pivots about the shock link fixed pivot 52. The embodiment of FIG. 4D differs from the embodiments of FIG. 4B in that the spring body 88 is between the damper body 89 and the second shock mount 58. In the embodiments of FIG. 4B, the damper body 89 was located between the spring body 88 and the second shock mount 58.

The shock absorber 44 includes a shaft seal 85. The shaft seal 85 is used to seal damping fluid or gas inside the spring body 88 and/or damper body 89 while allowing axial movement of an inshaft 80 and/or outshaft 90. The shaft seal 85 can be located at one end of a damper body 89, while sealing damping fluid or gas inside the damper body 89 and allowing axial movement of an outshaft 90. The shaft seal 85 can be located at one end of a damper body 89, while sealing damping fluid or gas inside the damper body 89, and additionally sealing gas inside the spring body 88, and allowing axial movement of an outshaft 90. The shaft seal 85 can be located at one end of a spring body 88, while sealing gas inside spring body 88 and allowing axial movement of an inshaft 80.

Turning again to FIG. 4E, the spring unit 48 may include an inshaft 180 that extends from the spring body 188. The first spring mount 57 is located in close proximity to the spring body 188. The second spring mount 59 is located in close proximity to one end of the inshaft 180, and the inshaft 180 is pivotably connected to the spring connection pivot 160 by the second spring mount 59 such that the inshaft 180 is compressible and extendable relative to the spring body 188 as the spring link 150 pivots about the spring link fixed pivot 152. The embodiment of FIG. 4E differs from the embodiments of FIGS. 4A, B, C, and D in that there is no outshaft 90 or damper 94.

The spring unit 48 includes the shaft seal 185. The shaft seal 185 is used to seal gas inside the spring body 188 while allowing axial movement of the inshaft 180. The shaft seal 185 can be located at one end of a spring body 188, while sealing gas inside spring body 188 and allowing axial movement of an inshaft 180.

Figure 5A:
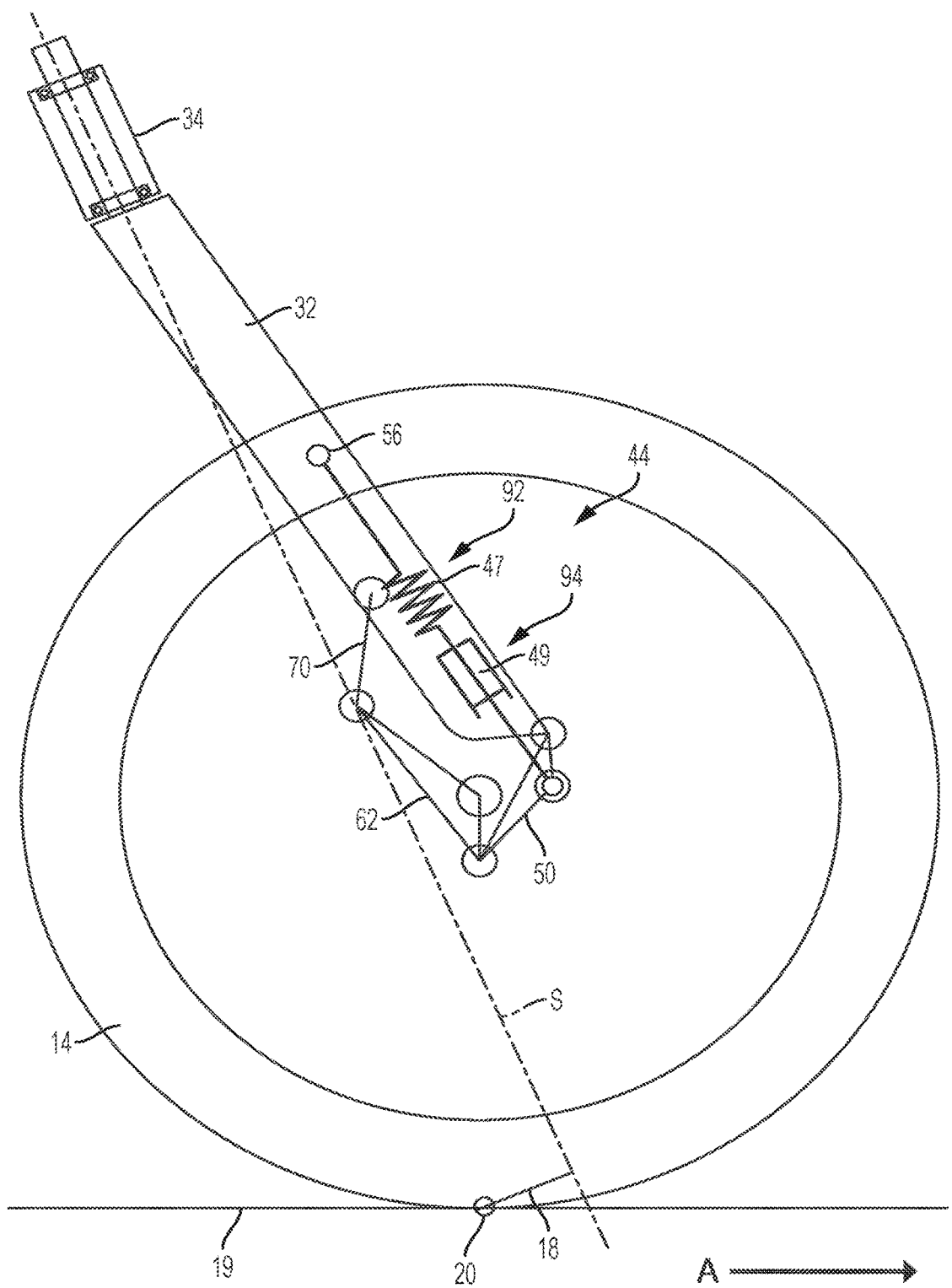
FIG. 5A is a side schematic view of the embodiment of a wheel suspension assembly of FIG. 2A, having the shock absorber of FIG. 4A or 4B.

FIG. 5A illustrates the wheel suspension assembly of FIG. 2A, with the shock absorber of FIG. 4A or 4B, in engineering symbols that distinguish a mechanical spring 47 (in this case a gas spring) and dashpot 49 (or damper) of the shock absorber 44. The body of the dashpot 49 and one end of the mechanical spring 47 are connected to the first shock mount 56 to operably connect a gas spring with a damper to provide concurrent movement of spring and damper components during suspension compression and extension. The mechanical spring 47 is located above the dashpot 49 in an inline configuration in this embodiment.

Figure 5B:
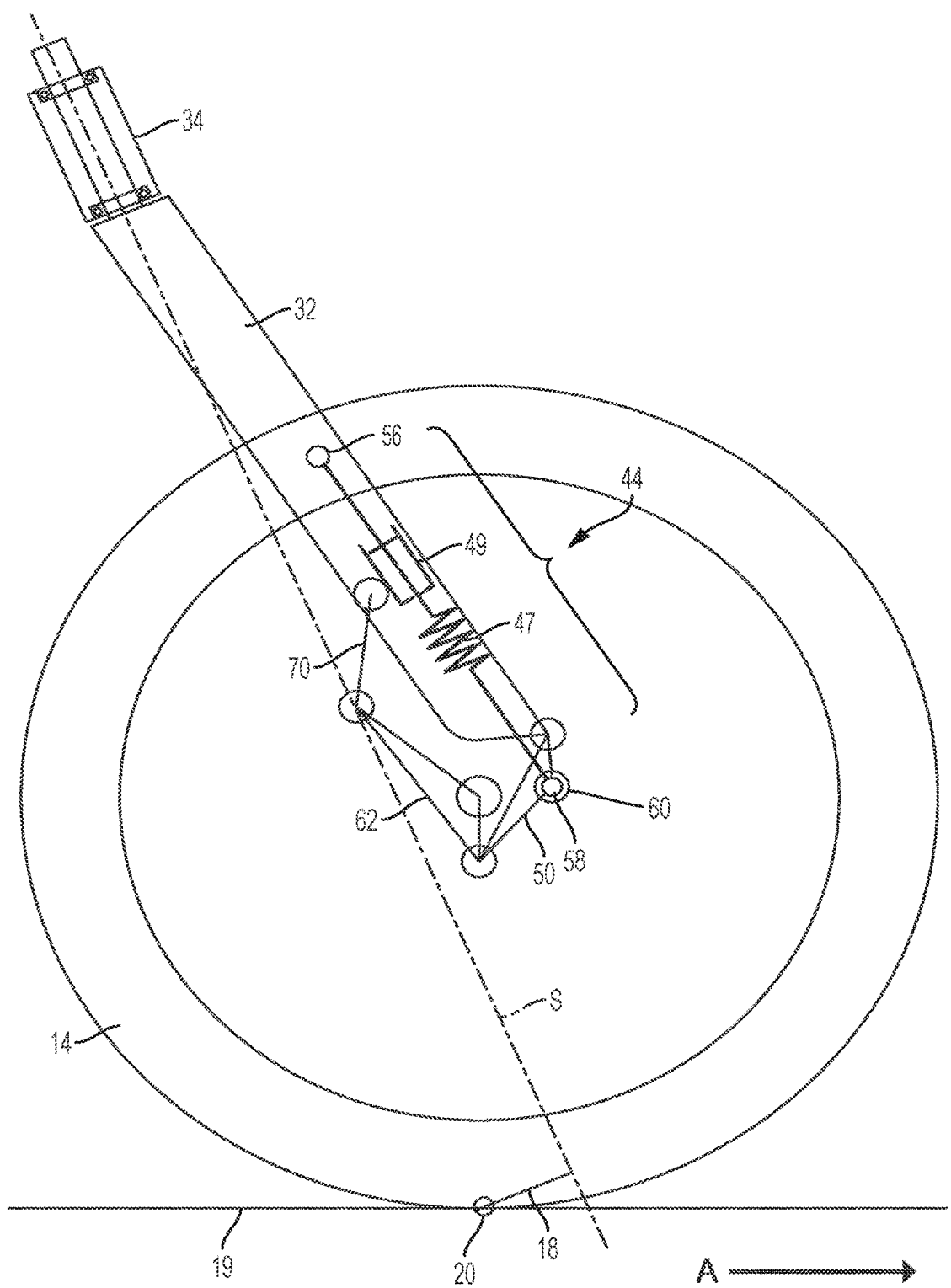
FIG. 5B is a side schematic view of the embodiment of a wheel suspension assembly of FIG. 2A, having the shock absorber of FIG. 4C or 4D.

FIG. 5B illustrates the wheel suspension assembly of FIG. 2A, with the shock absorber of FIG. 4C or 4D, in engineering symbols that distinguish a mechanical spring 47 and dashpot 49 of the shock absorber 44. The body of the dashpot 49 and one end of the mechanical spring 47 are connected to the first shock mount 56 to operably connect a gas spring with a damper to provide concurrent movement of spring and damper components during suspension compression and extension. The dashpot 49 is located above the mechanical spring 47 in an inline configuration in this embodiment.

Figure 4E:
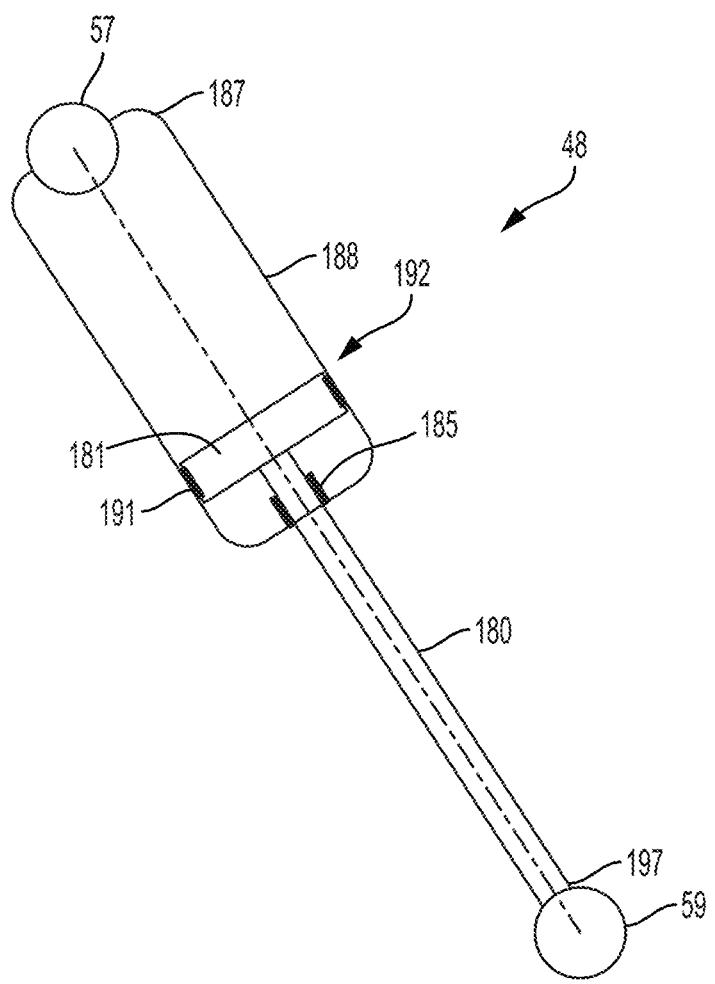
FIG. 4E is a side cut-away view of a first embodiment of a gas spring of the wheel suspension assembly of FIG. 2B.
Figure 5C:
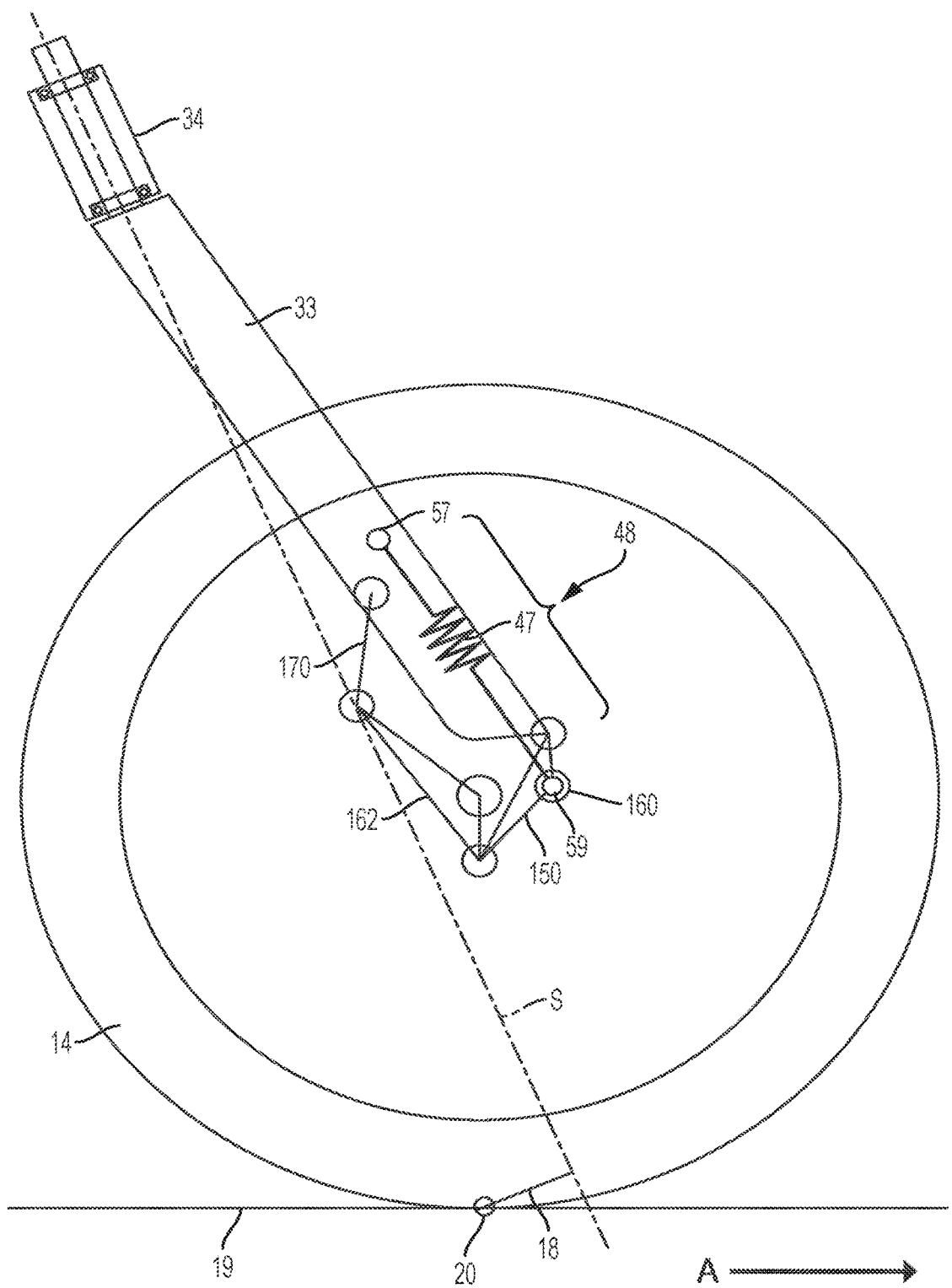
FIG. 5C is a side schematic view of the embodiment of a wheel suspension assembly of FIG. 2B, having the gas spring of FIG. 4E.

FIG. 5C illustrates the wheel suspension assembly of FIG. 2B, with the spring unit 48 of FIG. 4E, in engineering symbols that distinguish a mechanical spring 47 of the spring unit 48. The body of the mechanical spring 47 is connected to the first spring mount 57 to operably provide movement of spring components during suspension compression and extension.

Returning now to FIGS. 2-4, the control link 70 is pivotably mounted to the first arm 32 at the first arm control pivot 76 that is located between the first arm fixed pivot 40 and the first arm shock pivot 42, along a length of the first arm 32.

Turning now to FIGS. 6A-6D, several embodiments of structures are illustrated that may be used as the pivots (fixed and/or floating) described herein.

Figure 6A:
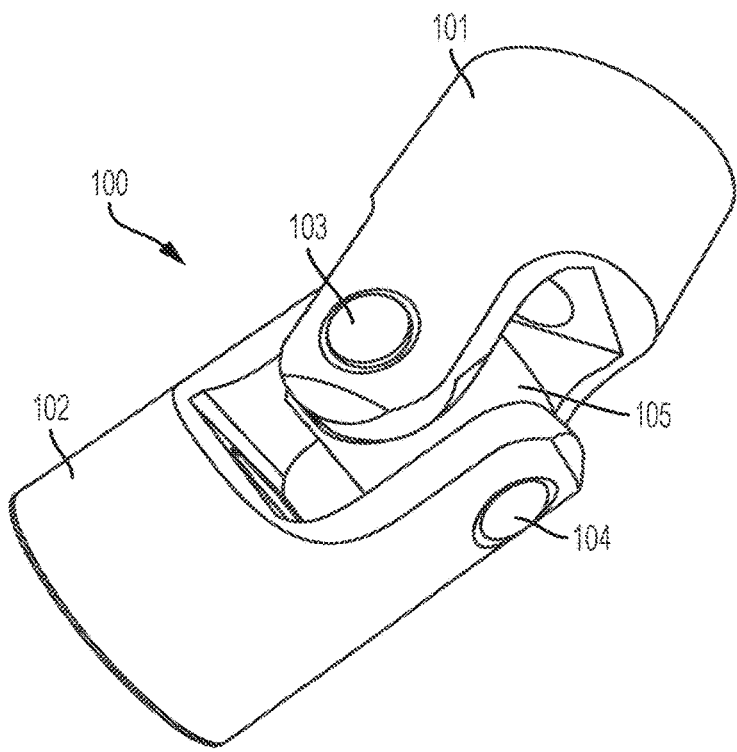
FIG. 6A is a perspective view of a first embodiment of a pivot of the wheel suspension assembly of FIG. 2A.

FIG. 6A illustrates a cardan pivot 100. The cardan pivot includes a first member 101 and a second member 102 that are pivotably connected to one another by yoke 105 which comprises a first pin 103 and a second pin 104. As a result, the first member 101 and the second member 102 may move relative to one another about an axis of the first pin 103 and/or about an axis of the second pin 104.

Figure 6B:
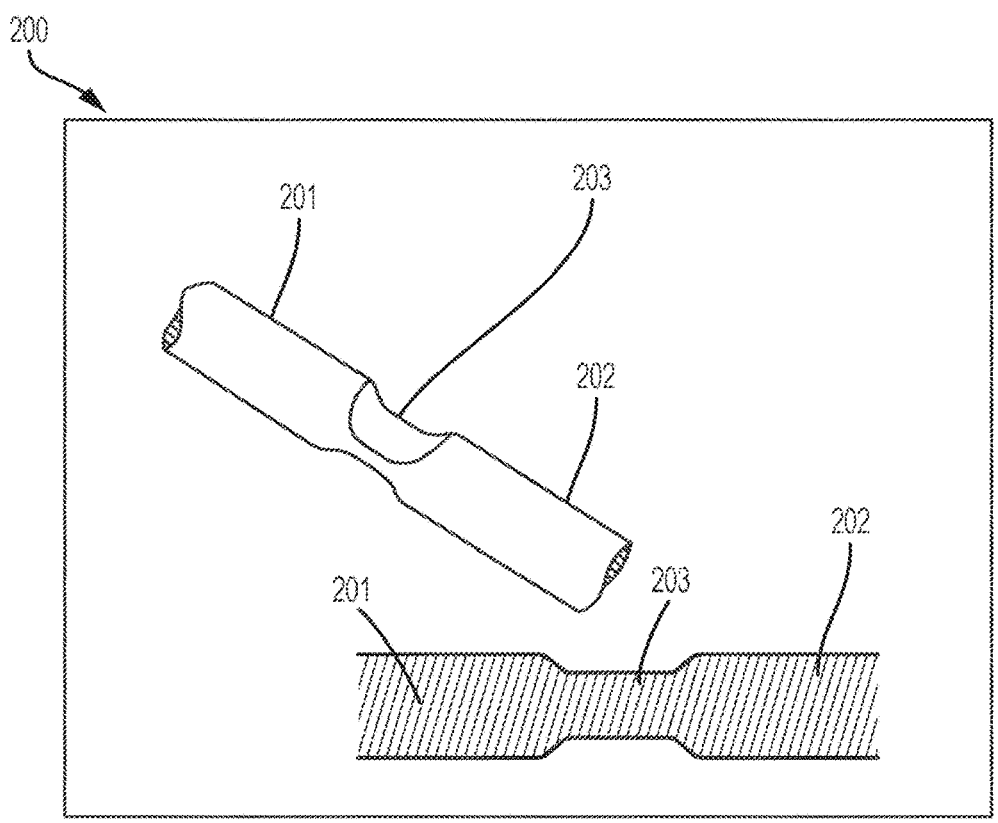
FIG. 6B is a side view of a second embodiment of a pivot of the wheel suspension assembly of FIG. 2A.

FIG. 6B illustrates a flexure pivot 200. The flexure pivot 200 includes a flexible portion 203 disposed between a first member 201 and a second member 202. In the illustrated embodiment, the first member 201, the second member 202, and the flexible portion 203 may be integrally formed. In other embodiments, the first member 201, the second member 202, and the flexible portion 203 may be separate elements that are connected to one another. In any event, the flexible portion 203 allows relative motion between the first member 201 and the second member 202 about the flexible portion 203. The flexible portion 203 is more flexible than the members 201 and 202, permitting localized flexure at the flexible portion 203. In the illustrated embodiment, the flexible portion 203 is formed by a thinner portion of the overall structure. The flexible portion 203 is thinned sufficiently to allow flexibility in the overall structure. In certain embodiments, the flexible portion 203 is shorter than 100 mm. In certain embodiments, the flexible portion 203 is shorter than 70 mm. In certain embodiments, the flexible portion 203 is shorter than 50 mm. In certain embodiments, the flexible portion 203 is shorter than 40 mm. In certain preferred embodiments, the flexible portion 203 is shorter than 30 mm. In certain other preferred embodiments, the flexible portion 203 is shorter than 25 mm.

Figure 6C:
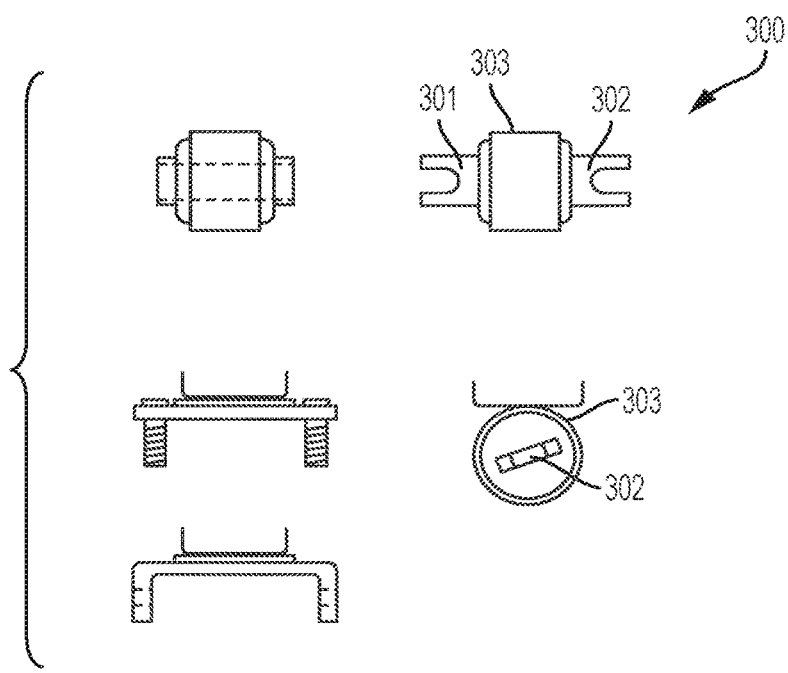
FIG. 6C is an exploded view of a third embodiment of a pivot of the wheel suspension assembly of FIG. 2A.

FIG. 6C illustrates a bar pin pivot 300. The bar pin pivot includes a first bar arm 301 and a second bar arm 302 that are rotatably connected to a central hub 303. The central hub 303 allows the first bar arm 301 and the second bar arm 302 to rotate around a common axis.

Figure 6D:
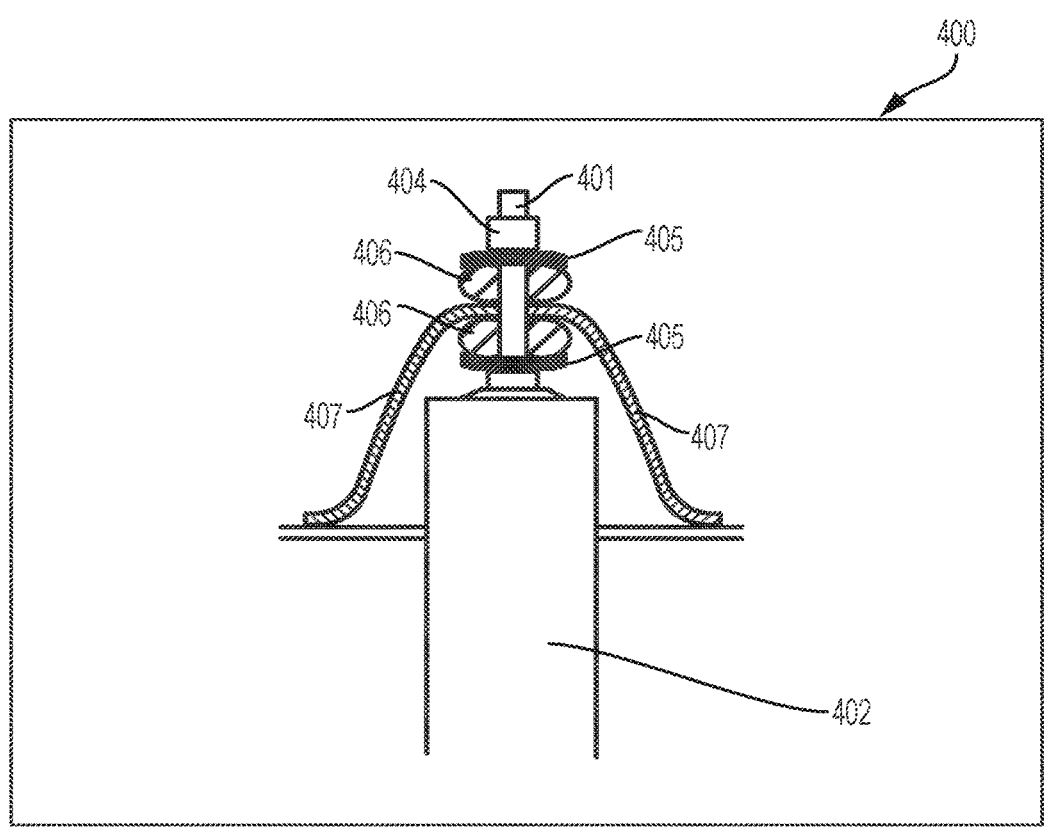
FIG. 6D is a side view of a fourth embodiment of a pivot of the wheel suspension assembly of FIG. 2A.

FIG. 6D illustrates a post mount pivot 400. The post mount pivot 400 includes a mounting stem 401 that extends from a first shock member 402. The mounting stem 401 is connected to a structure 407 by a nut 404, one or more retainers 405, and one or more grommets 406. The first shock member 402 is allowed relative movement by displacement of the grommets 406, which allows the mounting stem 401 to move relative to a structure 407 in at least one degree of freedom.

Figure 7A:
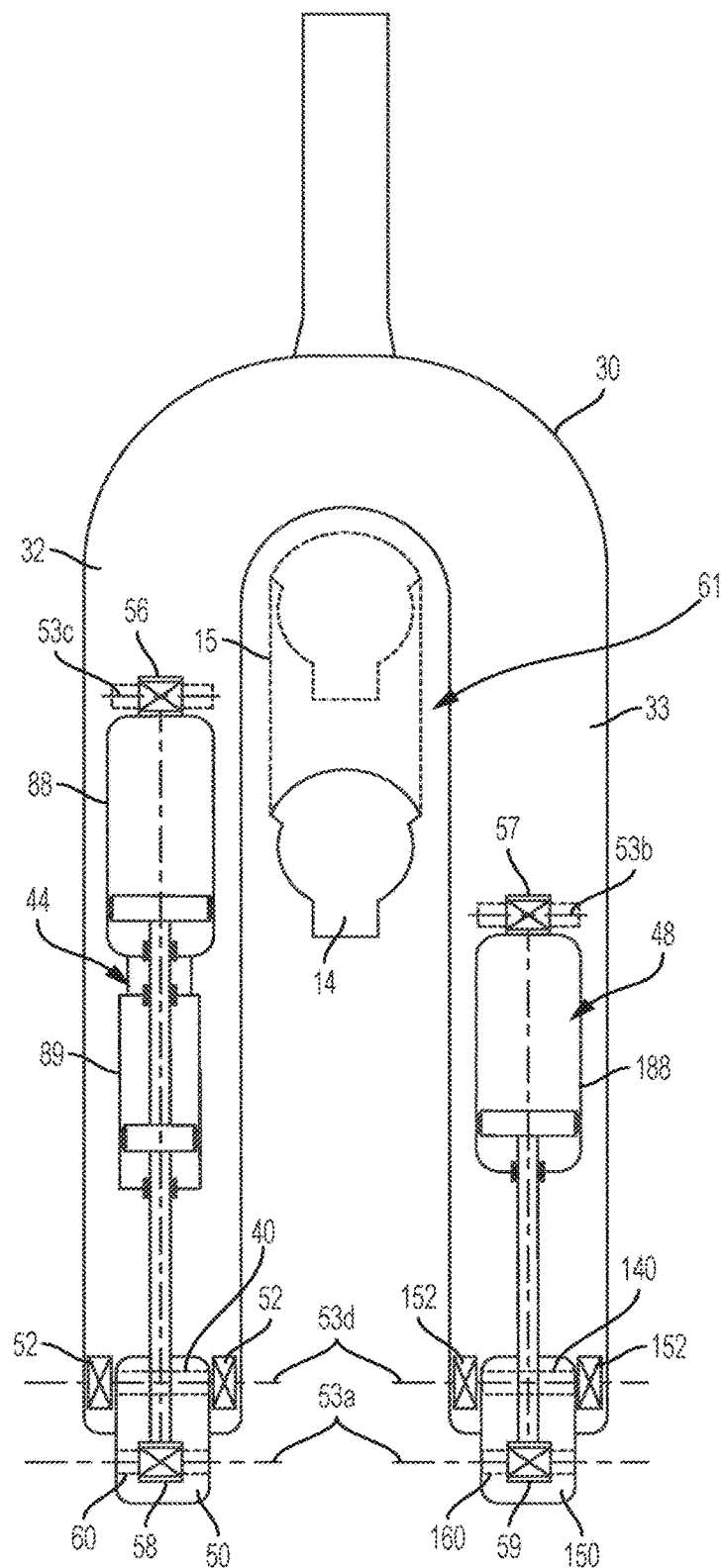
FIG. 7A is a front cut-away view of the embodiment of the wheel suspension assembly of FIGS. 2A and 2B.

FIG. 7A illustrates a certain embodiment of the wheel suspension assembly in a front view, where a space between the first arm 32 and the second arm 33 of the steering fork 30, in part, defines a wheel opening 61. The front wheel 14 moves within an envelope 15, during suspension compression and extension. The wheel opening 61 allows clearance for the front wheel 14 so that the front wheel 14 does not contact the steering fork 30 during suspension compression and extension. In this embodiment, the shock absorber 44 is shown positioned on the first arm 32, and the spring unit 48 is shown positioned on the second arm 33.

The shock link 50 (or the spring link 150) is pivotably connected to the first arm fixed pivot 40 or to the second arm fixed pivot 140 at the shock link fixed pivot 52, or at the spring link fixed pivot 152 such that the shock link 50 (or the spring link 150) is rotatable about a first pivot axis 53a of the shock link fixed pivot 52(or of the spring link fixed pivot 152) and the shock link fixed pivot 52(or the spring link fixed pivot 152) remains in a fixed location relative to the first arm 32, or to the second arm 33, while the shock link 50 (or the spring link 150) is movable relative to the first arm 32, or to the second arm 33.

The shock absorber 44 includes the first shock mount 56 and the second shock mount 58, the first shock mount 56 being pivotably connected to the first arm 32 about a pivot axis 53c. The second shock mount 58 is formed at one end of the inshaft 80, and the inshaft 80 is pivotably connected about the pivot axis 53a to the shock connection pivot 60 by the second shock mount 58 such that the inshaft 80 is compressible and extendable relative to the damper body 89 and spring body 88 as the shock link 50 pivots about the shock link fixed pivot 52.

The spring unit 48 includes the first spring mount 57 and the second spring mount 59, the first spring mount 57 being pivotably connected to the second arm 33 about a pivot axis 53b. The second the second spring mount 59 is formed at one end of the inshaft 180, and the inshaft 180 is pivotably connected about the pivot axis 53a to the shock connection pivot 60 by the second spring mount 59 such that the inshaft 180 is compressible and extendable relative to the spring body 188 as the shock link 150 pivots about the spring link fixed pivot 152.

Figure 7B:
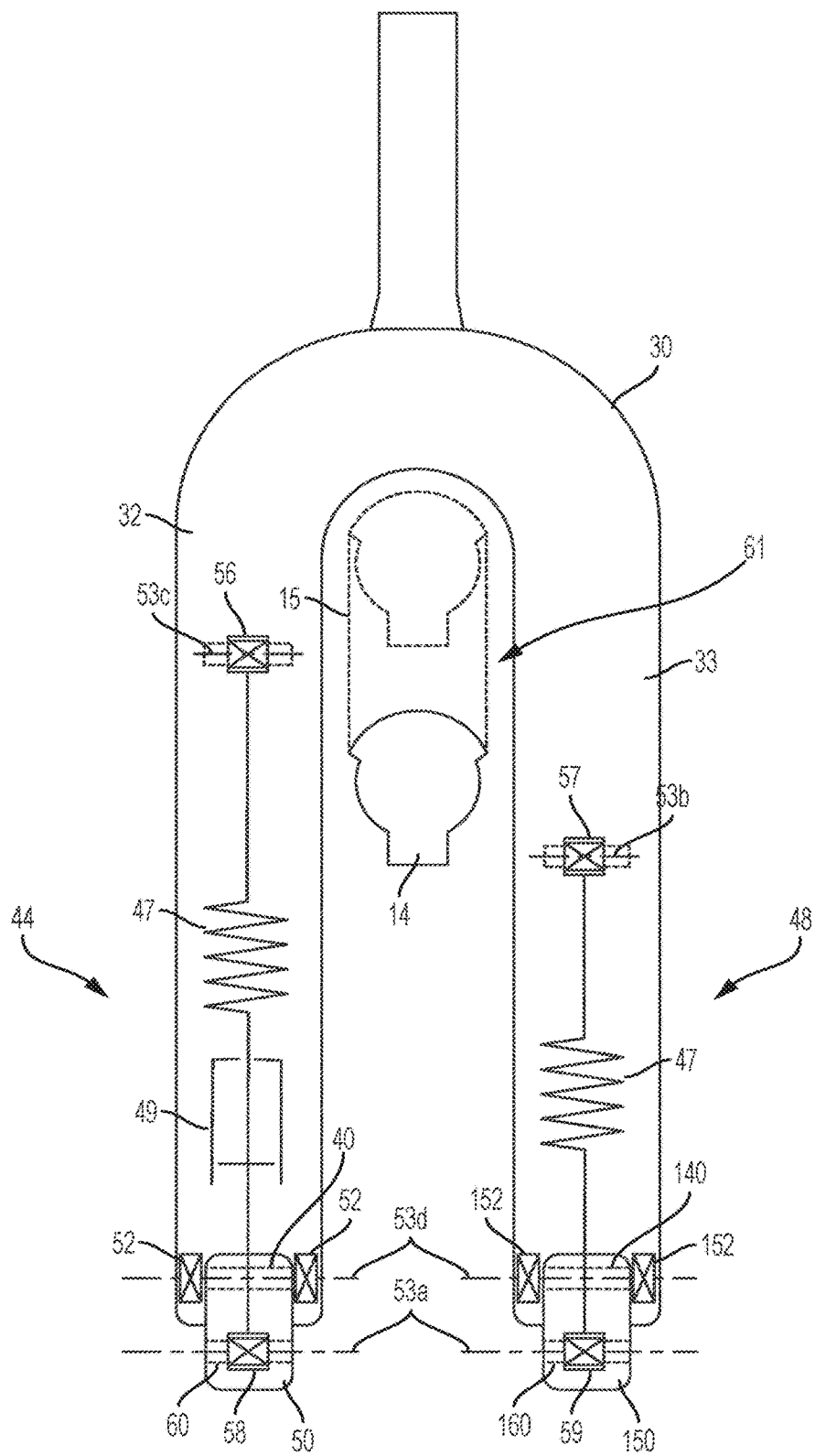
FIG. 7B is a front cut-away schematic view of the embodiment of the wheel suspension assembly of FIGS. 2A and 2B.

FIG. 7B illustrates the wheel suspension assembly of FIG. 7A, in a front view, with the shock absorber of FIGS. A-D, in engineering symbols that distinguish a mechanical spring 47 and dashpot 49 of the shock absorber 44. The body of the dashpot 49 and one end of the mechanical spring 47 are connected to the first shock mount 56 to operably connect a gas spring with a damper to provide concurrent movement of spring and damper components during suspension compression and extension. The dashpot 49 is located below the mechanical spring 47 in an inline configuration in this embodiment, but the dashpot 49 could be located above or concentric to the mechanical spring 47 in other configurations.

A space between the first arm 32 and the second arm 33 of the steering fork 30, in part, defines the wheel opening 61. The front wheel 14 moves within the envelope 15, during suspension compression and extension. The wheel opening 61 allows clearance for the front wheel 14 so that the front wheel 14 does not contact the steering fork 30 during suspension compression and extension. In this embodiment, the shock absorber 44 includes the mechanical spring 47 and the dashpot 49 is shown positioned on the first arm 32, and the spring unit 48 including a mechanical spring 47 is shown positioned on the second arm 33. In other embodiments, the shock absorber 44 could be positioned on the second arm 33, and a spring unit 48 could be positioned on the first arm 32.

The shock link 50 is pivotably connected to the first arm fixed pivot 40 at the shock link fixed pivot 52 such that the shock link 50 is rotatable about pivot axis 53d of the shock link fixed pivot 52 and the shock link fixed pivot 52 remains in a fixed location relative to the first arm 32, while the shock link 50 is movable relative to the first arm 32.

Figure 8:
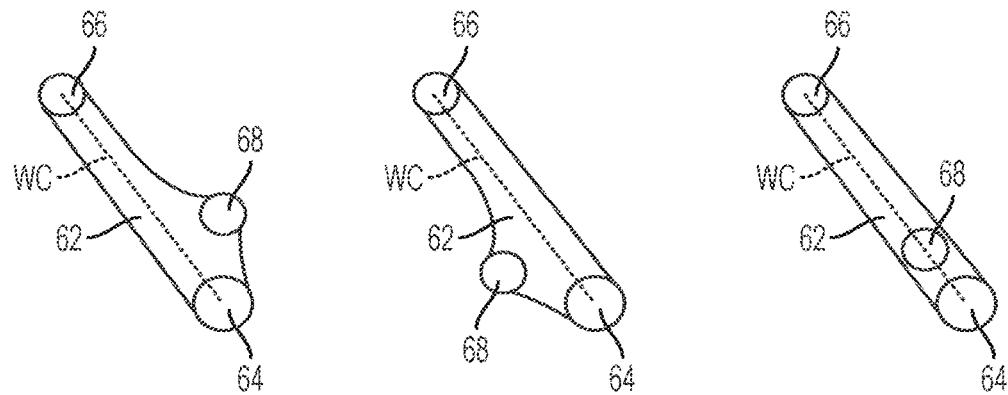
FIG. 8 is a side schematic view showing certain embodiments of wheel carriers of the suspension assembly.
Figure 8:
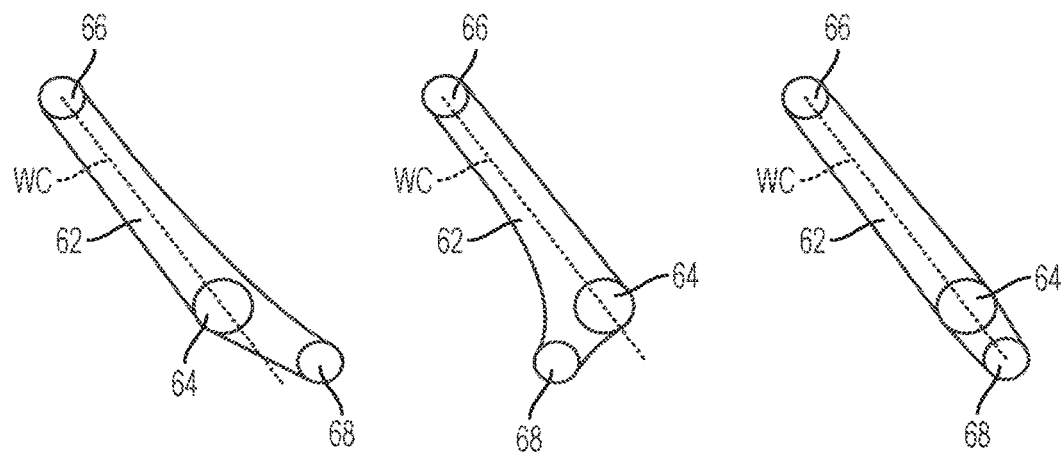

FIG. 8 illustrates in a side schematic view certain embodiments of wheel carriers of the suspension assembly. A first wheel carrier 62 is illustrated, and it should be understood that the features of the first wheel carrier 62 can be similar or equivalent to the features of a second wheel carrier 162 as illustrated in other figures herein. In the illustrated embodiments, the wheel mount 68 can be located at any point attached to the first wheel carrier 62. The wheel mount 68 can be located on either side of, or in-line with a line wheel carrier axis WC. The wheel mount 68 can be located between a wheel carrier first pivot 64 and a wheel carrier second pivot 66 or the wheel mount 68 can be located not between a wheel carrier first pivot 64 and a wheel carrier second pivot 66.

The disclosed wheel suspension assemblies can be designed to be lighter in weight, lower in friction, more compliant, safer, and perform better than traditional wheel suspension assemblies.

The disclosed wheel suspension assemblies also reduce stiction and increase stability during braking, cornering, and shock absorption, when compared to traditional wheel suspension assemblies.

The disclosed wheel suspension assemblies are particularly well suited to E-bikes. E-bikes are heavier and faster than typical mountain bikes. They are usually piloted by less skilled and less fit riders, and require a stronger front suspension to handle normal riding conditions. E-bikes are difficult to build, requiring the challenging integration of motors and batteries into frame designs. In many cases, the electric parts are large and unsightly.

E-bikes are typically cost prohibitive to build as well, requiring special fittings to adapt motors and batteries. To integrate one center-drive motor, the additional cost to the manufacturer is about double the price of a common bicycle frame. That cost is multiplied and passed onto the consumer.

The beneficial caster effect described above with respect to the disclosed wheel suspension assemblies is an important improvement over traditional wheel suspension assemblies and reduces some of the drawbacks of E-bikes.

Additionally, because the disclosed wheel suspension assemblies are not constrained by round stantions, the oval fork legs balance fore-aft and side to side compliance for ultimate traction. Combining superior chassis stiffness while eliminating stiction gives the disclosed wheel suspension assemblies a performance advantage over traditional wheel suspension assemblies.

While a two-wheeled bicycle is disclosed, the disclosed wheel assemblies are equally applicable to any cycle, such as motorcycle, unicycle, or tricycle vehicles.

Furthermore, the disclosed wheel suspension assemblies are easily retrofittable to traditional cycles.

What is claimed:

1. A suspension assembly for a cycle, the suspension assembly comprising:
   a steering fork, the steering fork having a first arm and a second arm, each of the first arm and the second arm having a first end and a second end;
   a shock absorber having a damper body and gas spring comprising a spring body, the spring body being sequentially arranged along a substantially common central axis with the damper body, the shock absorber including a first shock mount and a second shock mount, the first shock mount being connected to the first arm, the second shock mount being pivotably connected to a shock link, and the shock absorber being located on the first arm;
   a spring unit, having a gas spring comprising a spring body, a first spring mount and a second spring mount, the first spring mount being connected to the second arm, the second spring mount being pivotably connected to the shock link, and the spring unit being substantially located on the second arm;
   wherein the suspension assembly comprises a multi-bar trailing link configuration and the suspension assembly further comprises:
      a first arm fixed pivot, a first arm shock pivot, and a first arm control pivot, a space between the first arm and the second arm forming a wheel opening;
      the shock link having a shock link fixed pivot and a shock link floating pivot spaced apart from one another, the shock link being pivotably connected to the first arm fixed pivot at the shock link fixed pivot such that the shock link is rotatable about the shock link fixed pivot and the shock link fixed pivot remains in a fixed location relative to the first arm while the shock link floating pivot is movable relative to the first arm;
      a wheel carrier, the wheel carrier having a wheel carrier first pivot and a wheel carrier second pivot spaced apart from one another along a length of the wheel carrier, and a wheel mount that is adapted to be connected to a wheel, the wheel mount positioned between and spaced from each of the wheel carrier first pivot and the wheel carrier second pivot, the wheel carrier first pivot being pivotably connected to the shock link floating pivot so that the wheel carrier second pivot is rotatable about the wheel carrier first pivot relative to the shock link floating pivot; and
      a control link, the control link including a control link floating pivot and a control link fixed pivot, the control link floating pivot being pivotably connected to the wheel carrier second pivot, and the control link fixed pivot being pivotably connected to the first arm control pivot such that the control link floating pivot is rotatable about the control link fixed pivot, which remains in a fixed location relative to the first arm control pivot.

2. The suspension assembly of claim 1, wherein the damper body is located between the spring body of the gas spring of the shock absorber and the second shock mount along the common central axis.

3. The suspension assembly of claim 1, wherein the damper body houses a damper piston and the spring body of the gas spring of the shock absorber houses a gas piston.

4. The suspension assembly of claim 3, wherein the gas piston has a greater radial cross-sectional area than the damper piston.

5. The suspension assembly of claim 2, further comprising a first shaft seal located at a first end of the damper body to seal damping fluid or gas inside the damper body while allowing axial movement of an inshaft or an outshaft of the shock absorber.

6. The suspension assembly of claim 5, further comprising a second shaft seal located at a first end of the spring body of the gas spring of the shock absorber, the second shaft seal sealing gas inside the spring body of the gas spring of the shock absorber and allowing axial movement of the outshaft.

7. The suspension assembly of claim 6, further comprising a third shaft seal located at a second end of the damper body, the third shaft seal sealing damping fluid inside the damper body and allowing axial movement of the inshaft.

8. The suspension assembly of claim 2, further comprising a first shaft seal disposed between the damper body and the spring body of the gas spring of the shock absorber, the first shaft seal sealing damping fluid or gas inside the damper body and sealing gas in the spring body of the gas spring of the shock absorber while allowing axial movement of an inshaft and/or outshaft.

9. The suspension assembly of claim 8, further comprising a second shaft seal disposed at a first end of the damper body, the second shaft seal sealing gas inside the damper body and allowing axial movement of the inshaft.

10. The suspension assembly of claim 1, wherein the spring body of the gas spring of the shock absorber is located between the damper body and the second shock mount along the common central axis.

11. The suspension assembly of claim 10, further comprising a first shaft seal located at a first end of the damper body, the first shaft seal sealing gas inside the damper body and allowing axial movement of an outshaft.

12. The suspension assembly of claim 11, further comprising a second shaft seal located at a first end of the spring body of the gas spring of the shock absorber, the second shaft seal sealing damping fluid inside the spring body of the gas spring of the shock absorber and allowing axial movement of the outshaft.

13. The suspension assembly of claim 12, further comprising a third shaft seal located at a second end of the spring body of the gas spring of the shock absorber, the third shaft seal sealing damping fluid inside the spring body of the gas spring of the shock absorber and allowing axial movement of an inshaft.

14. The suspension assembly of claim 10, further comprising a first shaft seal disposed between the damper body and the spring body of the gas spring of the shock absorber, the first shaft seal sealing damping fluid or gas inside the damper body and sealing gas in the spring body of the gas spring of the shock absorber while allowing axial movement of an inshaft and/or outshaft.

15. The suspension assembly of claim 14, further comprising a second shaft seal disposed at a first end of the spring body of the gas spring of the shock absorber, the second shaft seal sealing gas inside the spring body of the gas spring of the shock absorber and allowing axial movement of the inshaft.

16. The suspension assembly of claim 1, wherein a central axis of the spring body of the gas spring of the shock absorber and a central axis of the damper body are arranged so that the central axis of the spring body of the gas spring of the shock absorber and the central axis of the damper body are offset from one another by a maximum of 100% of the outside diameter of an inshaft of the shock absorber.

17. The suspension assembly of claim 1, where the shock absorber has an inline configuration.

\* \* \* \* \*